(12) United States Patent
Ezrielev et al.

(10) Patent No.: US 11,720,464 B1
(45) Date of Patent: Aug. 8, 2023

(54) SYSTEM AND METHOD FOR REDUCTION OF DATA TRANSMISSION BY THRESHOLD ADAPTATION

(71) Applicant: Dell Products L.P., Round Rock, TX (US)

(72) Inventors: Ofir Ezrielev, Be'er Sheva (IL); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/726,225

(22) Filed: Apr. 21, 2022

(51) Int. Cl.
G06F 11/00 (2006.01)
G06F 11/30 (2006.01)

(52) U.S. Cl.
CPC ...... *G06F 11/3082* (2013.01); *G06F 11/3006* (2013.01); *G06F 11/3075* (2013.01)

(58) Field of Classification Search
CPC ............ G06F 11/3082; G06F 11/3006; G06F 11/3075; G06F 11/076; G06F 11/1443; G06F 11/30; G06F 11/3452
See application file for complete search history.

(56) References Cited

U.S. PATENT DOCUMENTS

| | | | |
|---|---|---|---|
| 2016/0026520 A1* | 1/2016 | Bouta | G06F 11/0709 714/47.2 |
| 2019/0044786 A1* | 2/2019 | Wouhaybi | H04L 67/1093 |
| 2021/0376853 A1* | 12/2021 | De | H03M 7/6088 |

OTHER PUBLICATIONS

Pearl, Judea. "Causal inference in statistics: An overview." Statistics surveys 3 (2009): 96-146. https://projecteuclid.org/journals/statistics-surveys/volume-3/issue-none/Causal-inference-in-statistics-An-overview/10.1214/09-SS057.short.

Xie, Yaochen, et al. "Self-supervised learning of graph neural networks: A unified review." IEEE Transactions on Pattern Analysis and Machine Intelligence (2022). https://ieeexplore.ieee.org/abstract/document/9764632/.

Kumar, Manoj, et al. "Genetic algorithm: Review and application." Available at SSRN 3529843 (2010). https://papers.ssrn.com/sol3/papers.cfm?abstract_id=3529843.

Lewandowski, M.; Płaczek, B.; Bernas, M.; Classifier-Based Data Transmission Reduction in Wearable Sensor Network for Human Activity Monitoring Sensors 2021, 21, 85. https://doi.org/10.3390/s21010085.

Le Borgne, Yann-Aël & Santini, Silvia & Bontempi, Gianluca. (2007). Adaptive model selection for time series prediction in wireless sensor networks. Signal Processing. 87. 3010-3020. 10.1016/j.sigpro.2007.05 015.

(Continued)

*Primary Examiner* — Charles Ehne

(74) *Attorney, Agent, or Firm* — Womble Bond Dickinson (US) LLP

(57) ABSTRACT

Methods and systems for managing data collection are disclosed. To manage data collection, a system may include a data aggregator and a data collector. The data aggregator and/or data collector may utilize inference models to predict the future operation of the data collector. To minimize data transmission, the data collector may transmit a representation of data to the data aggregator only if the representation of data falls outside a threshold. The threshold may be adapted by the data aggregator in response to the needs of downstream consumers of the data.

20 Claims, 17 Drawing Sheets

(56) References Cited

OTHER PUBLICATIONS

Ankur Jain, Edward Y. Chang, Yuan-Fang Wang; Adaptive stream resource management using Kalman Filters. SIGMOD '04: Proceedings of the 2004 ACM SIGMOD international conference on Management of data Jun. 2004 pp. 11-22 https://doi.org/10.1145/1007568.1007573.

X. Feng, X. Zhenzhen, Y. Lin, S. Weifeng and L. Mingchu, "Prediction-based data transmission for energy conservation in wireless body sensors," 2010 The 5th Annual ICST Wireless Internet Conference (WICON), 2010, pp. 1-9.

Tulone, Daniela & Madden, Samuel. (2006). An energy-efficient querying framework in sensor networks for detecting node similarities. 191-300. 10.1145/1164717.1164768.

Lu, Qing & Jiang, Weiwen & Xu, Xiaowei & Shi, Yiyu & Hu, Jingtong. (2019). On Neural Architecture Search for Resource-Constrained Hardware Platforms.

"Detecting data drift on data sets," Web page <https://docs.microsoft.com/en-us/azure/machine-learning/how-to-monitor-datasets?tabs=python>, Nov. 10, 2021, retrieved from Internet Archive Wayback Machine <https://web.archive.org/web/20210420083010/https://docs.microsoft.com/en-us/azure/machine-learning/how-to-monitor-datasets?tabs=python> on Apr. 27, 2022).

\* cited by examiner

SYSTEM AND METHOD FOR REDUCTION OF DATA TRANSMISSION BY THRESHOLD ADAPTATION

FIELD

Embodiments disclosed herein relate generally to data collection. More particularly, embodiments disclosed herein relate to systems and methods to limit the transmission of data during data collection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
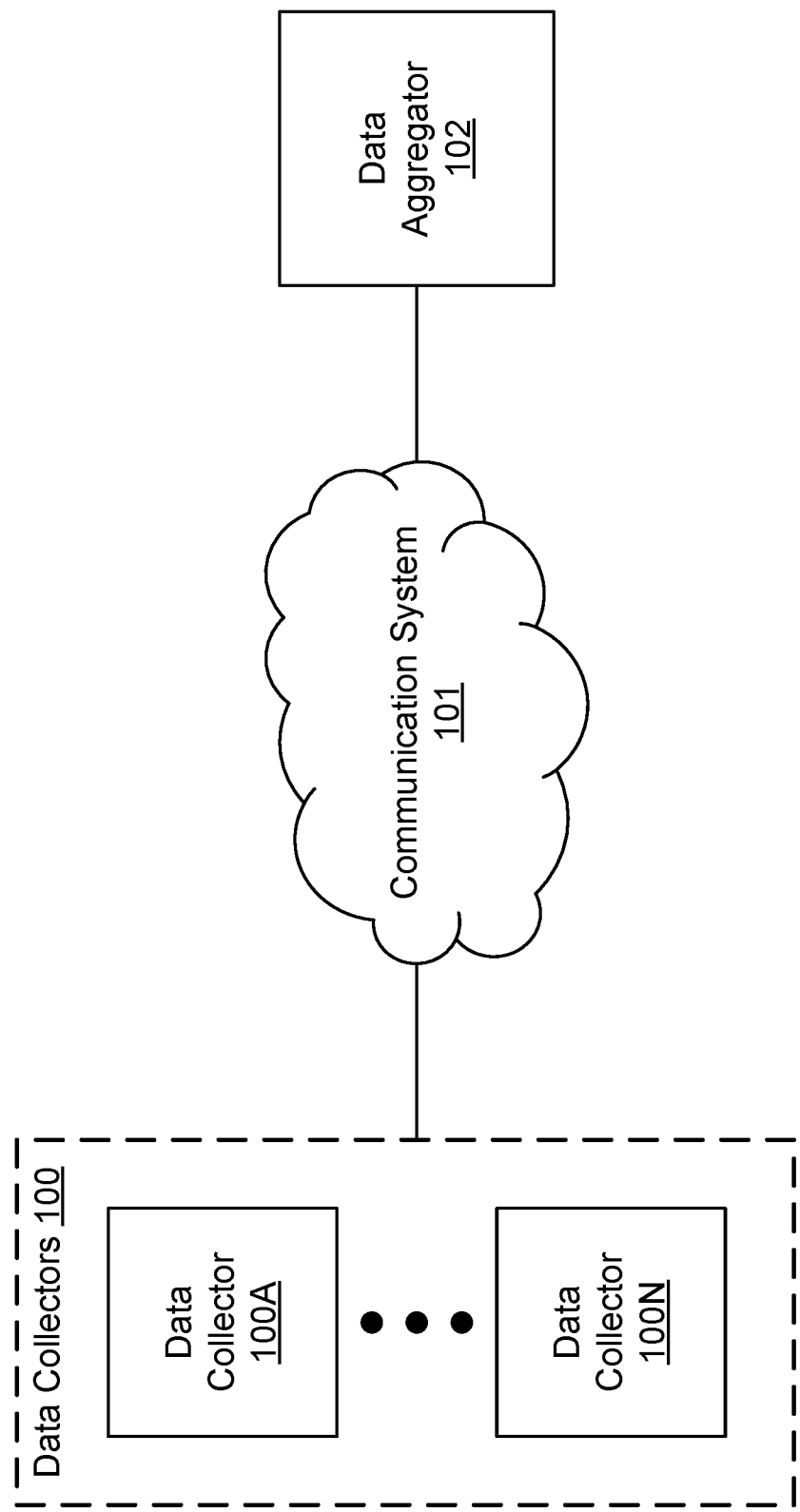
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data collection in a distributed environment. To manage data collection, the system may include a data aggregator and a data collector. The data aggregator and may utilize an inference model to predict data based on future measurements performed by data collectors throughout a distributed environment without having access to the measurements.

The data aggregator may obtain validated data intended for consumption by downstream applications. Validated data may include data based on measurements performed by a data collector and/or inferences obtained from an inference model hosted by the data aggregator, the inferences being intended to match data based on measurements performed by a data collector.

The data aggregator may obtain representations of data from the data collectors if the representations of data fall outside a threshold. A threshold may be based on: (i) data obtained from a data collector and (ii) a sensitivity obtained from a downstream consumer of the data. A sensitivity may be based on a change in the operation of a consumer which is keyed to a characteristic (e.g., a data value, data range, etc.) of validated data (e.g., which may include a time series relationship tracked by the consumer). Consequently, the consumer may be prompted to change its operation if the validated data meets the keyed characteristic indicated by the sensitivity.

The data aggregator may monitor trends in validated data to determine if the validated data meets the keyed characteristic indicated by the sensitivity from the downstream consumer. If the validated data meets the keyed characteristic indicated by the sensitivity, consumers may require more accurate validated data until the sensitivity is no longer met.

In order to provide consumers with more accurate validated data, the data aggregator may decrease the threshold for data transmissions. By doing so, a narrower range of inferences may be determined accurate and, therefore, representations of data may be transmitted to the data aggregator more frequently. In contrast, the data aggregator may increase the threshold for data transmissions if the sensitivity is no longer met. In this scenario, a wider range of inferences may be determined accurate and, therefore, data transmissions may be reduced, communication system bandwidth may be conserved, and energy consumption of the devices may be reduced throughout the system.

In an embodiment, a method for managing data collection in a distributed environment where data is collected in a data aggregator of the distributed environment and from a data collector operably connected to the data aggregator via a communication system is provided.

The method may include obtaining, by the data aggregator, a portion of validated data, the portion of validated data increases a duration of a time series relationship represented by the validated data; making a determination, by the data aggregator, that a data trend in the validated data has occurred based at least in part on the portion of the validated data and a sensitivity of a consumer of the validated data, the sensitivity of the consumer being based on a change in operation of the consumer which is keyed to a characteristic of the time series relationship; obtaining, by the data aggregator, an updated threshold based on the data trend, the updated threshold being likely to increase a rate of data transmission from the data collector to the data aggregator; enforcing, by the data aggregator, the updated threshold on a data collector associated with the portion of the validated data.

The method may also include obtaining, by the data aggregator, a second portion of the validated data, the second portion of validated data further increases the duration of the time series relationship represented by the validated data; making a second determination, by the data aggregator, that a second data trend in the validated data has occurred based at least in part on the second portion of the validated data and the sensitivity of the consumer of the validated data; obtaining, by the data aggregator, a second updated threshold based on the second data trend, the second updated threshold being likely to decrease the rate of the data transmission from the data collector to the data aggregator; enforcing, by the data aggregator, the second updated threshold on the data collector.

The second updated threshold may be smaller than the updated threshold.

The updated threshold may specify when representations of measurements obtained by the data collector are to be provided to the data aggregator.

The data trend may indicate that the measurements obtained by the data collector are likely to meet the keyed characteristic of the time series relationship.

The second data trend may indicate that the measurements obtained by the data collector are unlikely to meet the keyed characteristic of the time series relationship.

The method may also include, prior to obtaining the portion of the validated data: evaluating changes in operation of the consumer to identify the characteristic of the time series relationship associated with the change in the operation of the consumer; generating a threshold based on the identified characteristic; and deploying the threshold to the data collector.

The consumer may include an application that initiates a procedure in response to the characteristic of the time series relationship meeting a condition.

The data transmission from the data collector may include a difference between an inference generated by the data collector and a value obtained by a measurement performed by the data collector, and the difference being usable to reconstruct the value using a copy of the inference generated by the data aggregator.

The threshold may indicate a size of the difference that must be exceeded for the difference to be transmitted to the data aggregator, and the difference being discarded without transmission when the size of the difference does not exceed the threshold.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer-implemented services that may utilize data aggregated from various sources throughout a distributed environment.

The system may include data aggregator 102. Data aggregator 102 may provide all, or a portion, of the computer-implemented services. For example, data aggregator 102 may provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed environment.

For example, data aggregator 102 may be used as part of a control system in which data that may be obtained by data collectors 100 is used to make control decisions. Data such as temperatures, pressures, etc. may be collected by data collectors 100 and aggregated by data aggregator 102. Data aggregator 102 may make control decisions for systems using the aggregated data. In an industrial environment, for example, data aggregator 102 may decide when to open and/or close valves using the aggregated data. Data aggregator 102 may be utilized in other types of environments without departing from embodiments disclosed herein.

To facilitate data collection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively provide data collection services.

For example, all, or a portion, of data collectors 100 may provide data collection services to users and/or other computing devices operably connected to data collectors 100. The data collection services may include any type and quantity of services including, for example, temperature data collection, pH data collection, humidity data collection, etc. Different systems may provide similar and/or different data collection services.

To aggregate data from data collectors 100, some portion and/or representations of data collected by data collectors 100 may be transmitted across communication system 101 to data aggregator 102 (and/or other devices). The transmission of large quantities of data over communication system 101 may have undesirable effects on the communication system 101, data aggregator 102, and/or data collectors 100. For example, transmitting data across communication system 101 may consume network bandwidth and increase the energy consumption of data collectors 100. However, in some cases, it may be desirable to increase the volume of data transmissions in order to increase the accuracy of the aggregated data for consumption by downstream applications. In this scenario, data aggregator 102 and/or data collectors 100 may dynamically adapt the operation of the system in FIG. 1 in order to prioritize either data accuracy or data transmission reduction.

In general, embodiments disclosed herein may provide methods, systems, and/or devices for managing data collection in a distributed environment. To manage data collection in a distributed environment, a system in accordance with an embodiment may limit the transmission of data between components of the system while ensuring that all components that need access to the data to provide their respective functions are likely to have access to accurate data (e.g., such as the data based on measurements performed by data collectors 100). By limiting the transmission of data, communication bandwidth of the system of FIG. 1 may be preserved, energy consumption for data transmission may be reduced, etc.

To limit the transmission of data, data collectors 100 may transmit portions and/or representations of data if the portions and/or representations of data meet a threshold. The threshold may be a dynamic threshold and data aggregator and/or data collectors 100 may adapt the threshold in response to trends in the aggregated data. The trends in aggregated data may prompt data aggregator 102 to prioritize data accuracy and, therefore, the frequency of data transmission may increase. In contrast, trends in aggregated data may prompt data aggregator 102 to prioritize communication bandwidth minimization and, therefore, the frequency of data transmission may decrease.

To provide its functionality, data aggregator 102 may (i) prepare for data aggregation by obtaining a threshold for data transmission, the threshold being based on the operating requirements of consumers of the aggregated data, (ii) perform data aggregation by obtaining validated data, the validated data being data from data collectors 100 and/or inferences intended to match data from data collectors 100 (discussed in greater detail with respect to FIGS. 3B-3C), and (iii) adapting the method of data aggregation by modifying thresholds in response to trends in the validated data.

When performing its functionality, data aggregator 102 may perform all, or a portion, of the methods and/or actions shown in FIGS. 3A-3C and 3E.

Figure 3A:
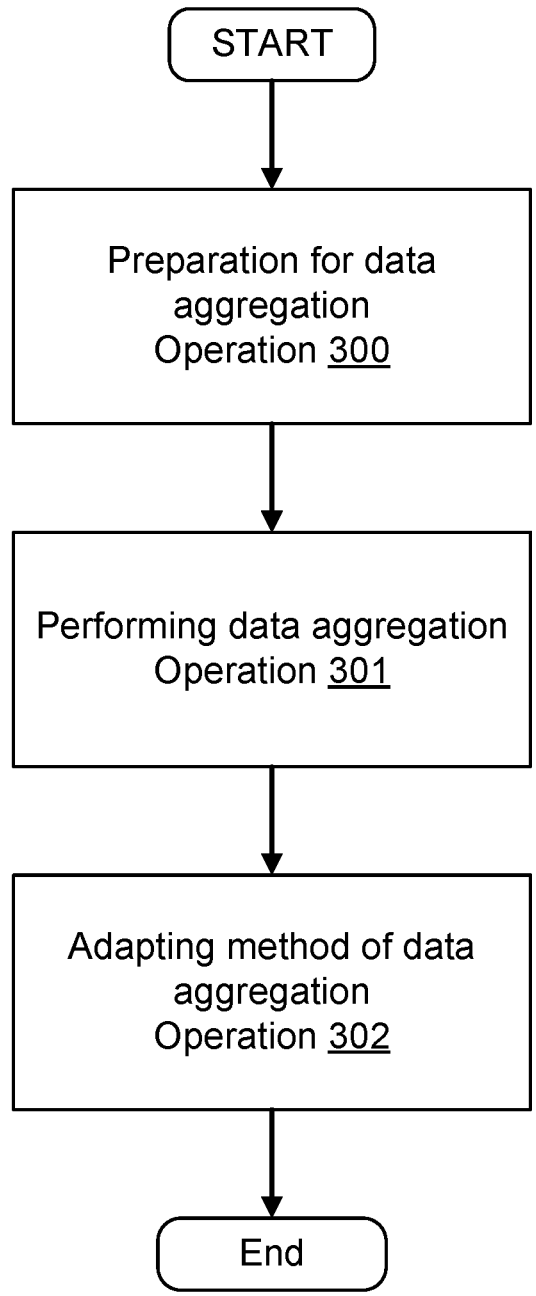
FIG. 3A shows a flow diagram illustrating a method of aggregating data in a distributed environment in accordance with an embodiment.
Figure 3B:
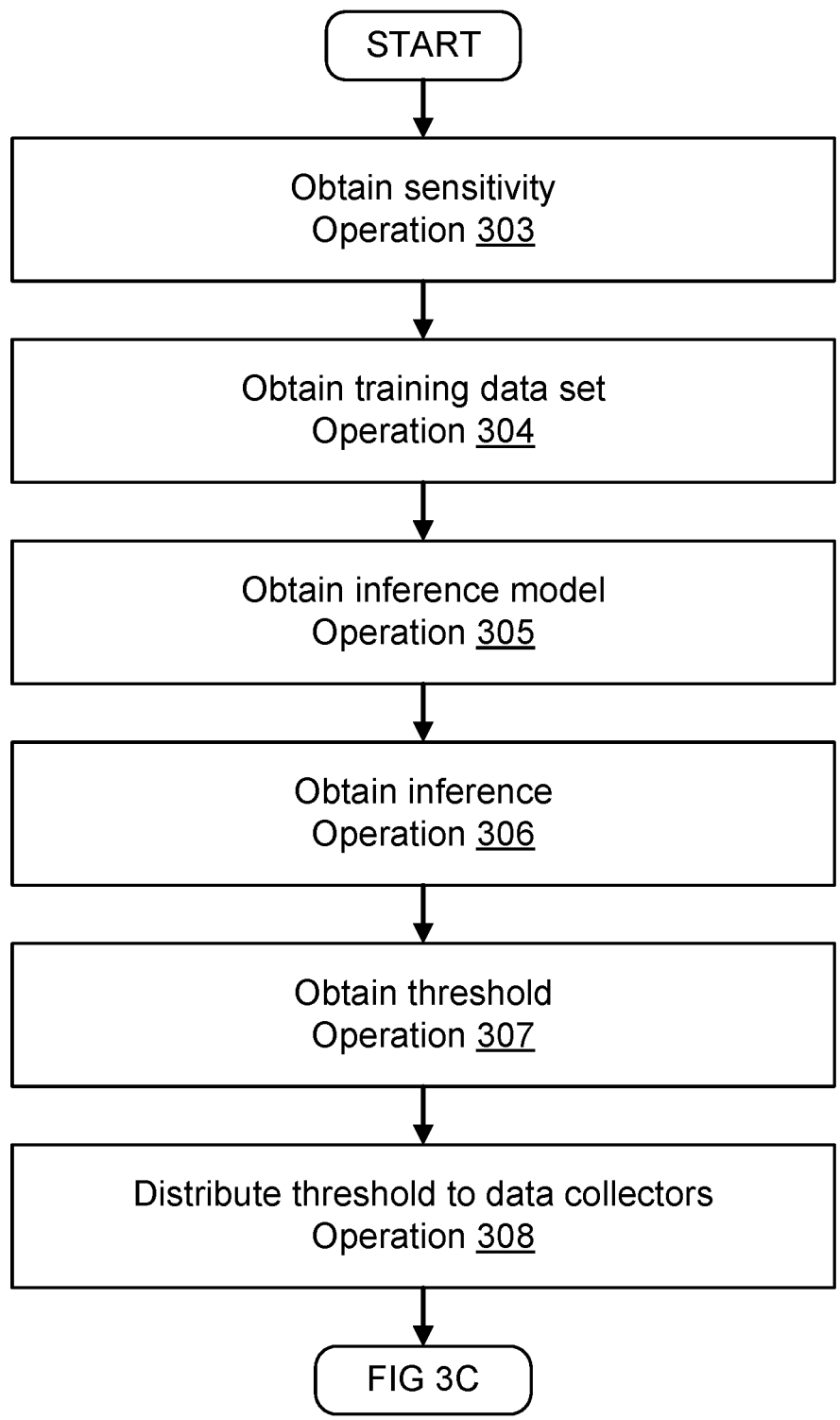
FIG. 3B shows a flow diagram illustrating a method of preparing for data aggregation in accordance with an embodiment.
Figure 3C:
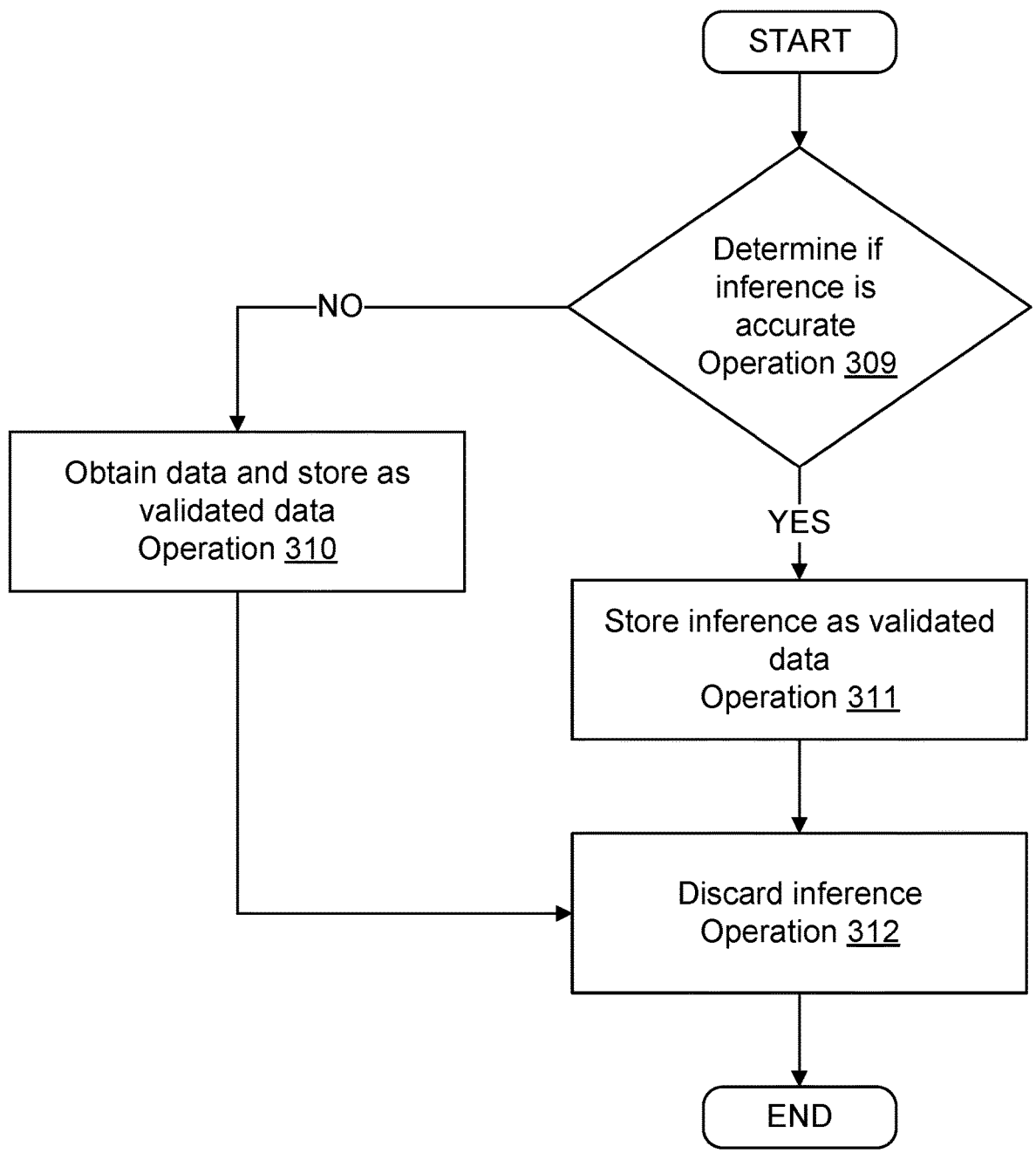
FIG. 3C shows a flow diagram illustrating a method of performing data validation in accordance with an embodiment.
Figure 3D:
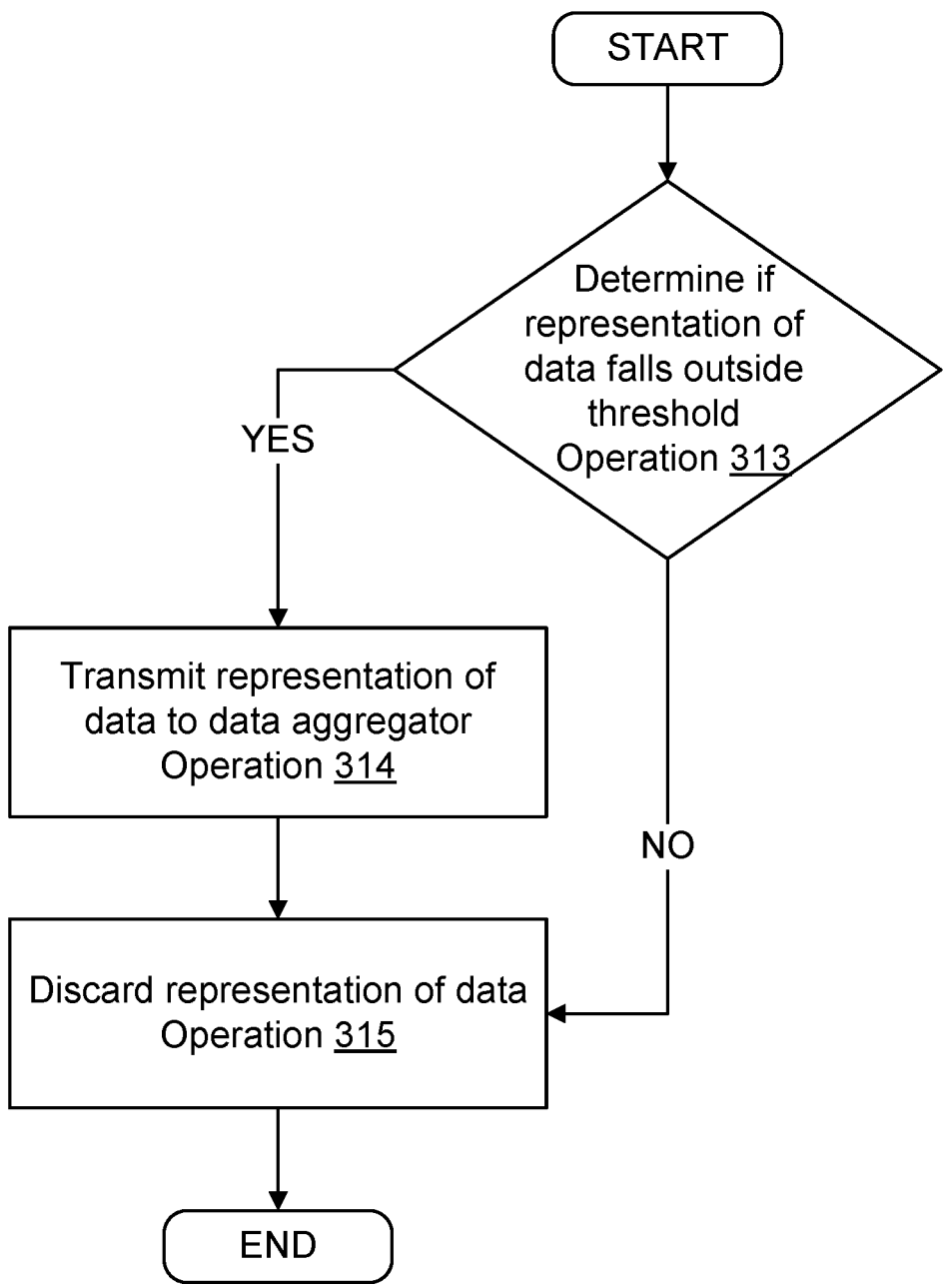
FIG. 3D shows a flow diagram illustrating a method of transmitting representations of data in accordance with an embodiment.

To provide its functionality, data collectors 100 may (i) obtain data based on a measurement of interest to the data aggregator or other entity (e.g., the consumer), and (ii) transmit a portion and/or representation of data to data aggregator 102 if a threshold is met (discussed in greater detail with respect to FIG. 3D).

When performing its functionality, data collectors 100 may perform all, or a portion, of the methods and/or actions shown in FIG. 3D.

In an embodiment, methods of data aggregation may utilize trained inference models to facilitate the reduction of data transmissions. In order to reduce data transmissions during data collection, inference models may be hosted and operated by data aggregator 102 and/or data collectors 100 and trained to predict data based on measurements performed by data collectors 100. Two potential scenarios for methods of data collection and aggregation utilizing inference models are described below. Inference models may be utilized to facilitate data collection and aggregation via other methods without departing from embodiments disclosed herein.

In a first scenario, data collectors 100 may obtain and transmit a data statistic (e.g., an average, a median, a mode, etc.) to data aggregator 102. Data aggregator 102 may host an inference model trained to predict data based on measurements performed by data collectors 100 and may obtain a complementary data statistic based on the inferences. If the data statistic matches the complementary data statistic within some threshold, the inference model may be determined accurate and the inferences may be stored as validated data. By doing so, full data sets may not be obtained by data aggregator 102 from data collectors 100 and, therefore, data transmissions may be reduced across communication system 101.

In a second scenario, identical copies of a trained twin inference model may be hosted by data aggregator 102 and data collectors 100 and, therefore, may generate identical inferences. Data collectors 100 may reduce network transmissions by generating a difference based on: (i) data based on measurements performed by the data collectors and (ii) inferences generated by the copy of the twin inference model hosted by the data collectors. If the difference falls below a threshold, the inference model may be determined accurate and the inferences may be stored as validated data. If the difference falls outside the threshold, data aggregator 102 may obtain the difference from data collectors 100 and may reconstruct data based on: (i) the difference and (ii) inferences generated by the copy of the twin inference model hosted by data aggregator 102. Consequently, full and/or partial data sets may not be transmitted over communication system 101 and network bandwidth consumption may be reduced. As mentioned above, inference models may be utilized to facilitate the reduction of data transmissions during data collection via other methods without departing from embodiments disclosed herein.

Data collectors 100 and/or data aggregator 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data collectors 100 are implemented using an internet of things (IoT) device, which may include a computing device. The IoT device may operate in accordance with a communication model and/or management model known to the data aggregator 102, other data collectors, and/or other devices.

Any of the components illustrated in FIG. 1 may be operably connected to each other (and/or components not illustrated) with a communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, the system of FIG. 1 may utilize both uplink (e.g., data aggregator to data collector) and downlink (e.g., data collector to data aggregator) pathways to transmit information throughout the distributed environment. In order to limit data transmission, reduced-size portions and/or representations of data may be transmitted rather than the data itself via these pathways. Further, to balance or improve the use of under-utilized pathways, data structures (e.g., thresholds for data transmission, copies of inference models, etc.) may be provided to the data collectors via the uplink pathways. Transmitting data via under-utilized uplink pathways may allocate the load on the system to more available pathways and facilitate a reduction in data transmissions overall throughout distributed environments.

While illustrated in FIG. 1 as included a limited number of specific components, a system in accordance with an embodiment may include fewer, additional, and/or different components than those illustrated therein.

Figure 2A:
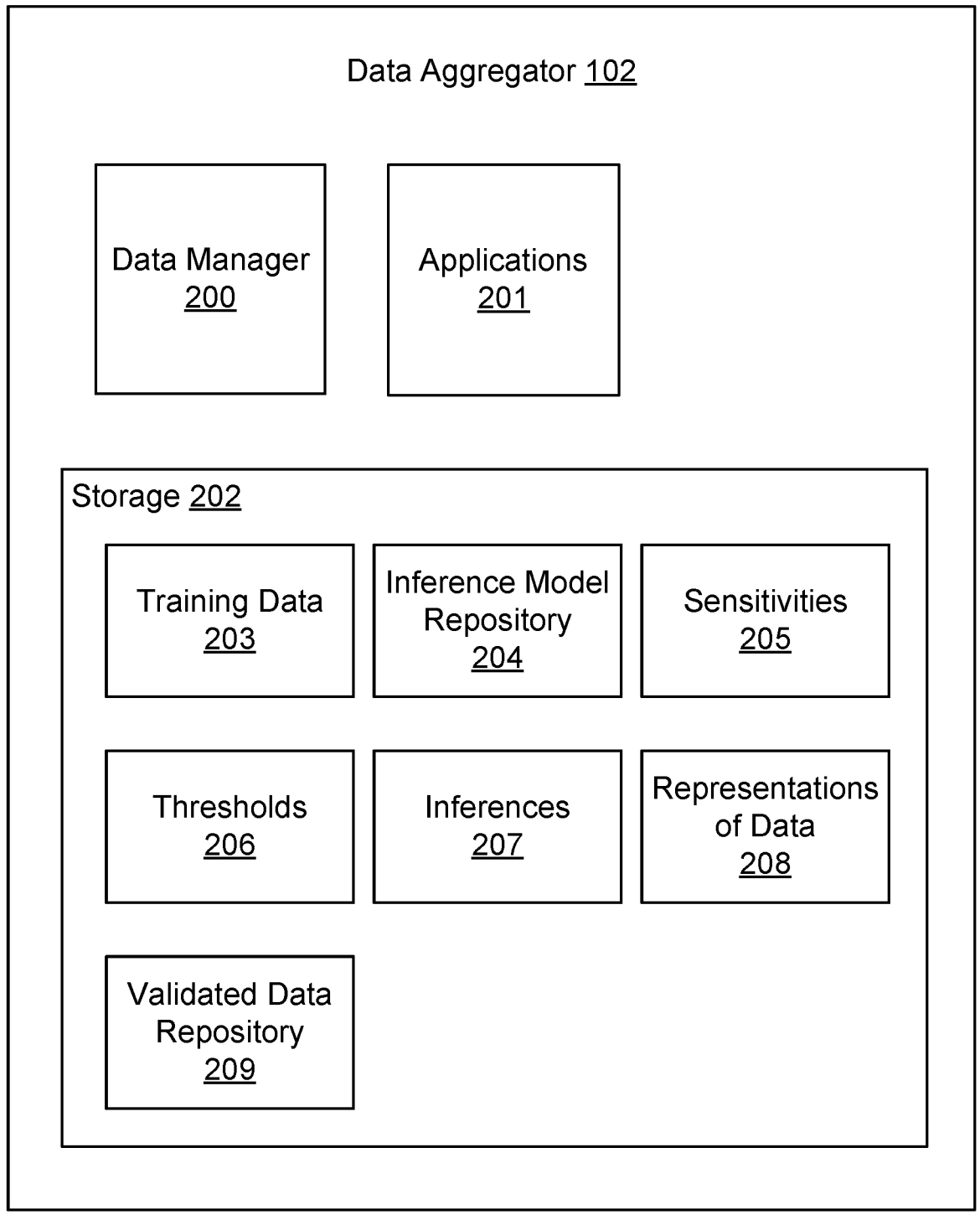
FIG. 2A shows a block diagram illustrating a data aggregator in accordance with an embodiment.

As discussed above, the system of FIG. 1 may include one or more data aggregators. Turning to FIG. 2A, a diagram of data aggregator 102 in accordance with an embodiment is shown. Data aggregator 102 may provide computer-implemented services that utilize data aggregated from various sources within a distributed environment. In order to do so, data aggregator 102 may utilize aggregated data without accessing (all of, or a portion thereof) data based on a series of measurements obtained by the sources (e.g., such as data collected by data collectors 100). By doing so, data transmission may be reduced and, therefore, communication bandwidth may be conserved. To provide its functionality, data aggregator 102 may include data manager 200, applications 201, and/or storage 202. Each of these components is discussed below.

Data manager 200 may (e.g., to provide all, or a portion, of the computer-implemented services) (i) obtain one or more sensitivities from consumers (and/or on a per consumer basis) and store in sensitivities 205 (and/or other locations), (ii) obtain one or more inference models and store a copy of one or more inference models in inference model repository 204 (and/or other locations), (iii) obtain one or more inferences using inference models (e.g., those from inference model repository 204), (iv) obtain one or more thresholds, (v) distribute copies of the thresholds to sources (e.g., data collectors 100) throughout a distributed environment, (vi) determine accuracy of the one or more inferences, (vii) obtain validated data, and (viii) adapt thresholds if needed based on trends in validated data and sensitivities from consumers.

In an embodiment, data manager 200 may obtain one or more sensitivities from consumers (e.g., downstream applications) throughout a distributed environment. Consumers may initiate certain procedures in response to trends in validated data and the sensitivities may be keyed to a condition under which these procedures may be prompted to occur. The condition keyed to the sensitivities may be a data value, data range, and/or other indicator that the time series relationship of the validated data may be approaching the sensitivity indicated by the consumer. Therefore, the operation of the consumer may change when this sensitivity is met.

For example, a consumer may be a temperature control system in an industrial environment programmed to ensure that the temperature of an environment does not exceed 95.0° C. The temperature control system may consume average temperature measurements from any number of temperature sensors to determine whether to raise or lower the temperature of the environment. In addition, the temperature control system may be programmed to begin a cooling process whenever the average temperature of the environment reaches 85.0° C. In this scenario, the temperature value of 85.0° C. may represent the sensitivity for the temperature control system. Therefore, when the average temperature of the environment falls below 85.0° C., the sensitivity may not be met. In contrast, when the average temperature of the environment reaches 85.0° C. or above, the sensitivity may be met and the temperature control system may begin cooling the environment.

As described above, data aggregator 102 and/or data collectors 100 may host inference models in order to facilitate the reduction of data transmission during data collection. For example, data aggregator 102 may host an inference model trained to predict data based on measurements performed by data collectors 100 as described below. Refer to FIG. 1 for additional details and examples regarding the use of inference models to facilitate the reduction of data transmission during data collection.

In an embodiment, data manager 200 may obtain one or more inference models to predict data based on measurements performed by data collectors 100. In a first scenario, data manager 200 may obtain one or more inference models from some entity through a communication system (e.g., communication system 101). In a second scenario, one or more inference models may be generated by data manager 200 using training data (e.g., from training data 203). In the second scenario, the training data may be fed into one or more predictive algorithms including, but not limited to, artificial neural networks, decision trees, support-vector machines, regression analysis, Bayesian networks, and/or genetic algorithms to generate one or more inference models. Inference models may be generated via other methods without departing from embodiments disclosed herein.

To generate an inference model, for example, a training data set may include a set of temperature measurements taken at various times in an industrial environment by one or more temperature sensors. For example, one temperature sensor may record the following data over the course of one hour: $T_1=80.0°$ C., $T_2=80.5°$ C., $T_3=81.0°$ C., $T_4=80.5°$ C., $T_5=81.5°$ C. Any of the above mentioned inference models (or other predictive algorithms) may be trained using this data set to predict future temperature measurements in the same environment (and/or similar environments). Data manager 200 may use this trained inference model to obtain inferences intended to predict data based on measurements performed by data collectors (e.g., data collectors 100).

In an embodiment, data manager 200 may obtain one or more inferences. As mentioned above, the inferences may be obtained by an inference model hosted by data aggregator 102. The inference model may be used to predict data obtained via measurements performed by a data collector (e.g., data collector 100A). Inferences may be generated via other methods without departing from embodiments disclosed herein.

In an embodiment, data manager 200 may obtain one or more thresholds, the thresholds being based on the sensitivities of consumers and data based on measurements performed by data collectors 100 (e.g., the previously described training data). The threshold may be a dynamic threshold, may be set by a user, and/or may be obtained from another entity through a communication system (e.g., communication system 101). Thresholds may be intended to determine whether a portion and/or representation of data may be transmitted during data collection. Refer to operation 307 in FIG. 3B for additional details regarding obtaining thresholds.

In an embodiment, data manager 200 may distribute a copy of any number of thresholds to sources (e.g., data collectors 100) throughout the distributed environment. By doing so, both data collectors 100 and data aggregator 102 may have access to identical thresholds. Data collectors 100 may use the thresholds to determine whether to transmit a representation of data (e.g., a portion of data, a data statistic, a difference, etc.) to data aggregator 102 during data collection. If data collectors 100 do not transmit a representation of data, data manager 200 may store inferences as validated data as described below.

In an embodiment, data manager 200 may determine accuracy of an inference based on whether a representation of data is provided by a data collector (e.g., data collector 100A). In one scenario, a representation of data may not be provided by a data collector if the representation of data falls below a threshold. In this scenario, the inference may be determined accurate. In a second scenario, a representation of data may be provided by a data collector if the representation of data falls outside a threshold. In this second scenario, the inference may be determined inaccurate. These scenarios are discussed in greater detail below.

In an embodiment, data manager 200 may obtain validated data. Validated data may include data obtained from data collectors 100 and/or inferences intended to match data based on measurements performed by data collectors 100. Scenarios for obtaining validated data are described below.

In an embodiment, data manager 200 may not obtain a representation of data from a data collector (e.g., data collector 100A) if the representation of data falls below a threshold. In this scenario, data manager 200 may determine an inference to be accurate and store the inference as validated data, the inference being intended to match data obtained via measurements performed by a data collector. In an embodiment, the inference may be generated by the inference model hosted by the data aggregator. Refer to operations 309-311 for additional details regarding determining the accuracy of inferences.

In an embodiment, data manager 200 may obtain a representation of data from a data collector (e.g., data collector 100A) if the representation of data falls outside a threshold. In this scenario, data manager 200 may determine an inference to be inaccurate, the inference being intended to match data obtained via measurements performed by a data collector. Data manager 200 may then obtain validated data using the representation of data provided by the data collector and/or the inference generated by the inference model hosted by the data aggregator. Refer to operation 310 for additional details regarding obtaining validated data using representations of data and/or inferences.

In an embodiment, data manager 200 may adapt thresholds as needed based on trends in validated data and sensitivities from consumers. Validated data may include data based on measurements performed by data collectors 100 and/or inferences obtained from the inference model hosted by data aggregator 102. Data manager 200 may monitor trends in the validated data to determine if the validated data may match a sensitivity provided by a consumer. A sensitivity may represent a condition that may initiate a change in the operation of the consumer.

In a first scenario, the validated data matches the sensitivity. In this scenario, the consumer may respond by performing an action. In addition, the consumer may require access to more frequent and accurate data transmissions while the validated data matches the sensitivity. In order to provide more frequent and accurate data transmissions, data manager 200 may lower the threshold used by data collectors 100 in order to determine whether to transmit differences. Therefore, data collectors 100 may determine a narrower range of inferences as accurate and transmit differences more frequently. By doing so, data aggregator 102 may obtain more accurate data and may be able to provide more accurate data to the consumers.

In a second scenario, data manager 200 may determine that the validated data does not match the sensitivity and, therefore, less frequent and accurate data transmissions may be acceptable. In this scenario, data manager 200 may raise the threshold used by data collectors 100 and a wider range of inferences may be determined accurate. By doing so, data aggregator 102 may store inferences as validated data more frequently and a reduced volume of data may be transmitted via communication system 101. Refer to operations 316-320 in FIG. 3E for additional details regarding adapting thresholds.

In a third scenario, data manager 200 may monitor the time series relationship of the validated data to identify trends and/or characteristics of the validated data that may occur regularly over time. Data manager 200 may utilize these trends/and or characteristics to identify expected trends and/or characteristics in the validated data for the consumer. For example, a temperature sensor monitoring the temperature of an environment over time may regularly collect temperature measurements in the range of 60-70° C. during a first portion of the day and temperature measurements in the range of 40-50° C. during a second portion of the day. The collected data may establish trends that, if encountered in the future, may be classified as being normal variation within the expected trends and/or characteristics while other trends, if encountered, may be treated as abnormalities.

Data manager 200 may compare trends in newly validated data to the expected trends and/or characteristics to detect anomalies for the consumer. For example, the above mentioned temperature sensor may collect temperature measurements in the range of 60-70° C. during the second portion of the day. This trend may not match the expected trend in the data used in the operation of the consumer. Therefore, data manager 200 may identify the temperature measurements in the range of 60-70° C. during the second portion of the day as an anomalous event.

Data manager 200 may modify thresholds in response to anomalous events. By modifying thresholds, data manager 200 may obtain more accurate data from data collectors 100 following (and/or during) anomalous events. For example, data manager 200 may lower the threshold for data transmissions, thereby increasing the frequency of data transmissions over communication system 101, in order to more closely monitor the measurements performed by data collectors 100. Data manager 200 may use this more accurate validated data to identify events of concern and/or to re-train inference models to reflect updated operating parameters of the consumer.

Applications 201 may consume data from validated data repository 209 to provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed environment.

For example, applications 201 may use the aggregated data to modify industrial manufacturing processes; to sound alerts for undesired operation of systems, locations of persons in an environment; and/or for any other type of purpose. Consequently, applications 201 may perform various actions (e.g., action sets) based on the data in validated data repository 209.

In an embodiment, one or more of data manager 200 and applications 201 is implemented using a hardware device including circuitry. The hardware device may be, for example, a digital signal processor, a field programmable gate array, or an application specific integrated circuit. The circuitry may be adapted to cause the hardware device to perform the functionality of data manager 200 and/or applications 201. One or more of data manager 200 and applications 201 may be implemented using other types of hardware devices without departing from embodiments disclosed herein.

In an embodiment, one or more of data manager 200 and applications 201 is implemented using a processor adapted to execute computing code stored on a persistent storage that when executed by the processor performs the functionality of data manager 200 and/or applications 201 discussed throughout this application. The processor may be a hardware processor including circuitry such as, for example, a central processing unit or a microcontroller. The processor may be other types of hardware devices for processing digital information without departing from embodiments disclosed herein.

When providing its functionality, data manager 200 and/or applications 201 may perform all, or a portion, of the operations and/or actions discussed with respect to FIGS. 3A-3C and 3E.

When providing its functionality, data manager 200 and/or applications 201 may store data and use data stored in storage 202.

In an embodiment, storage 202 is implemented using physical devices that provide data storage services (e.g., storing data and providing copies of previously stored data). The devices that provide data storage services may include hardware devices and/or logical devices. For example, storage 202 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 202 may include a memory device (e.g., a dual in line memory device) in which data is stored and from which copies of previously stored data are provided. In another example, storage 202 may include a persistent storage device (e.g., a solid-state disk drive) in which data is stored and from which copies of previously stored data is provided. In a still further example, storage 202 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 202 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 202 may store data structures including, for example, training data 203, inference model repository 204, sensitivities 205, thresholds 206, inferences 207, representations of data 208, and validated data repository 209. Any of these data structures may be usable by components of the system in FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein. Each of these data structures is discussed below.

In an embodiment, training data 203 may include training data usable to train a machine learning model (and/or other types of inference-generation models). Training data 203 may be obtained from various sources throughout a distributed environment (e.g., from data collectors 100) and may include (all of, or a portion thereof) a series of measurements representing an ambient environment and/or other types of measurements.

For example, training data 203 may include a set of temperature measurements taken at different times in an industrial environment by one or more temperature sensors. Temperature sensors may collect a set of temperature measurements at different times over any period of time. For example, one temperature sensor may record the following data over the course of one hour: $T_1$=80.0° C., $T_2$=80.5° C., $T_3$=81.0° C., $T_4$=80.5° C., $T_5$=81.5° C. These temperature measurements may be temporarily or permanently stored by the temperature sensor and transmitted to a central temperature control system when requested for purposes of training a machine-learning model to predict future temperature measurements in the same environment (and/or other purposes).

In an embodiment, inference model repository 204 may include copies of one or more inference models. The inference models may be obtained by feeding training data 203 into a machine learning (e.g., a deep learning) model to predict data based on measurements performed by data collectors 100 (and/or other sources) without having access to the measurements. Inference model repository 204 may contain other types of inference models without departing from embodiments disclosed herein.

For example, any number of temperature sensors throughout a distributed environment may record temperature measurements at various time intervals. Over any period of time, these temperature measurements may be collected and transmitted to a data aggregator. The data aggregator may utilize the set of temperature measurements for the purpose of training a machine-learning model to predict future temperature measurements in the same (and/or a substantially similar) environment (and/or for other purposes) thereby obtaining a machine-learning model which may be distributed to one or more of the temperature sensors.

The data aggregator may train the machine-learning model to predict a temperature value at a specific time. For example, the inference model hosted by the data aggregator may predict a value of 85.0° C. at $t_{12}$ without obtaining any temperature measurements from the temperature sensor. Inference models may be obtained and utilized via other methods without departing from embodiments disclosed herein.

In an embodiment, sensitivities 205 may include any number of sensitivities obtained from consumers (e.g., downstream applications) throughout a distributed environment. The sensitivities may be based on how the operation of the consumer is affected by changes in the time series relationship of the validated data. The sensitivities may be keyed to a condition (e.g., a certain data value or data range) in the time series relationship of the validated data. Therefore, the operation of the consumer may change when this sensitivity is met.

In an embodiment, thresholds 206 may include any number of thresholds obtained by data aggregator 102. Thresholds may be based on the sensitivities of consumers and data based on measurements performed by data collectors 100. The thresholds may be dynamic thresholds, may be set by a user, and/or may be obtained from another entity through a communication system (e.g., communication system 101). Refer to operation 307 in FIG. 3B for additional details regarding thresholds.

Inferences 207 may include any number of inferences obtained by data manager 200. The inferences may be generated by an inference model from inference model repository 204. The inference model may be obtained by feeding training data 203 into a machine learning (e.g., a deep learning) model. In an embodiment, a deep learning-based model is used to predict future measurements collected by data collectors 100 without having access to the series of measurements. The inferences may be, for example, predictions of temperature readings collected by a temperature sensor at various times. Refer to operation 306 in FIG. 3B for additional details regarding obtaining inferences.

In an embodiment, representations of data 208 may include any number or type of representations of data based on measurements performed by data collectors 100. Representations of data may include portions of collected data, data statistics (e.g., an average value), a difference (e.g., a difference between data and an inference), etc. The representations of data may be transmitted to data aggregator 102 by data collectors 100 if the representations of data fall outside a threshold (and/or for other reasons). Refer to operations 313-315 in FIG. 3D for additional details regarding obtaining and transmitting representations of data.

In an embodiment, validated data repository 209 may include any amount of data obtained from data collectors (e.g., data collectors 100) and/or inferences obtained by data aggregator 102. In a first example, data aggregator 102 may obtain a representation of data from a data collector. Data aggregator 102 may use the representation of data to obtain validated data based on measurements performed by the data collector. The validated data may be stored in validated data repository 209 (and/or other locations).

In a second example, data aggregator 102 may not receive a representation of data from data collectors 100. In this second scenario, data aggregator 102 may store an inference as validated data in validated data repository 209 (and/or other locations). The inference may be generated by an inference model and may be intended to match data based on measurements performed by data collectors within some threshold. Refer to operations 319-311 in FIG. 3C for additional details regarding obtaining validated data.

While illustrated in FIG. 2A as including a limited number of specific components, a data aggregator in accordance with an embodiment may include fewer, additional, and/or different components than shown in FIG. 2A.

Figure 2B:
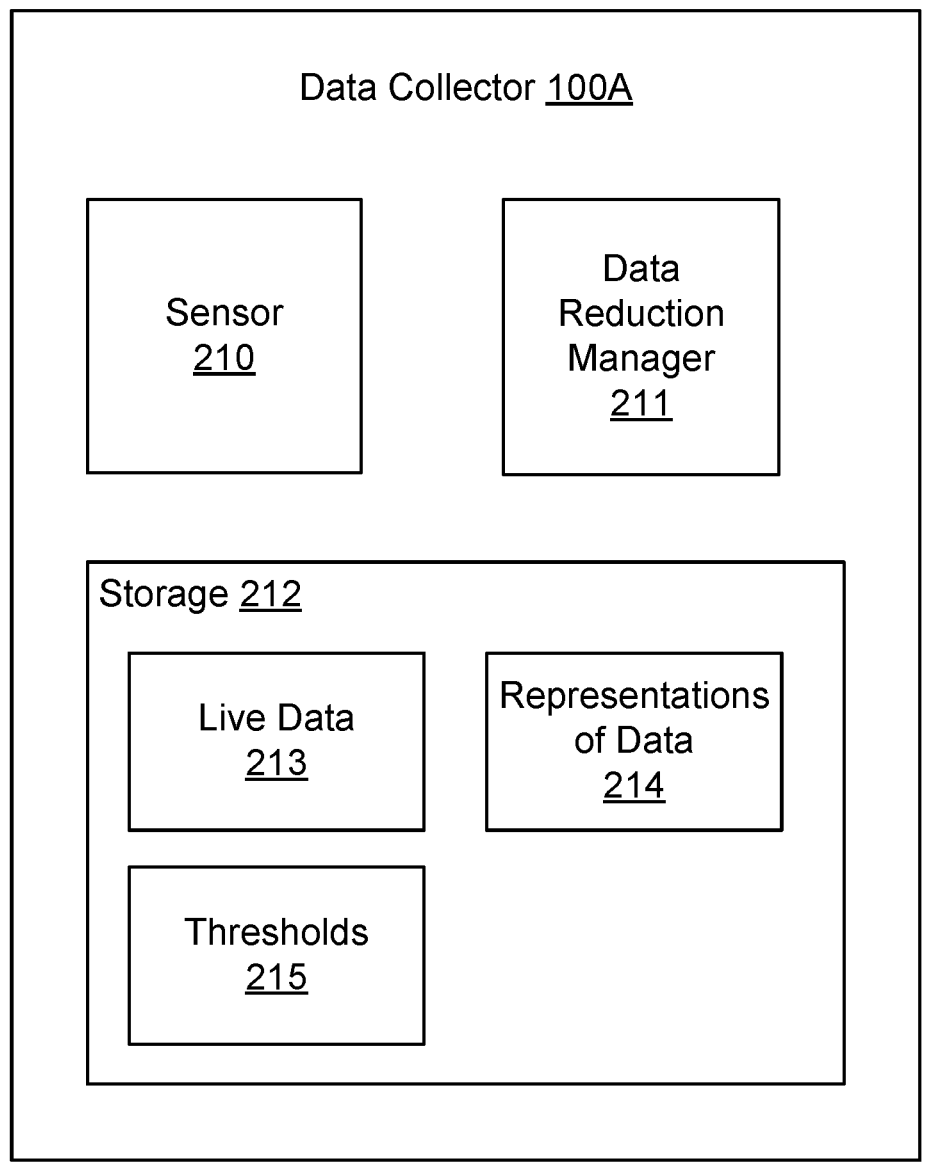
FIG. 2B shows a block diagram illustrating a data collector in accordance with an embodiment.

As discussed above, the system of FIG. 1 may include one or more data collectors (e.g., data collectors 100A-100N). Turning to FIG. 2B, a diagram of data collector 100A in accordance with an embodiment is shown. Data collector 100A may provide data collection services to users and/or other computing devices operably connected to data collector 100A. The data collection services may include any type and quantity of services including, for example, temperature data collection, pH data collection, humidity data collection, etc.

Following data collection, data collector 100A may generate a reduced-size representation of data based on a measurement performed by data collector 100A. In one example, the representation of data may be a difference obtained using: (i) data obtained via a measurement performed by data collector 100A and (ii) an inference generated by data collector 100A obtained using a copy of a twin inference model hosted by data collector 100A. The inference used to obtain the difference may be intended to match the data obtained via a measurement performed by data collector 100A. Data collector 100A may transmit this reduced-size difference to data aggregator 102 instead of the data obtained via a measurement performed by data collector 100A. By doing so, the amount of data transmitted throughout a distributed environment may be reduced, which may lead to a reduction in communication bandwidth consumption and energy consumption throughout the environment. Data collectors 100 may transmit portions and/or representations of data via other methods without departing from embodiments disclosed herein. To provide its functionality, data collector 100A may include sensor 210, data reduction manager 211, and storage 212. Each of these components is described below.

Sensor 210 may obtain a series of measurements representing a characteristic of an ambient environment. For example, sensor 210 may be a temperature sensor positioned in an industrial environment to obtain temperature measurements at various time intervals over the course of each hour. For example, sensor 210 may obtain the following series of measurements over the course of the first hour of data collection: $T_1=80.5°$ C., $T_2=80.0°$ C., $T_{3=79.5}°$ C., $T_4=85.0°$ C., $T_5=84.0°$ C. Sensor 210 may store at least a portion of these measurements in storage 212 (and/or other locations).

Data reduction manager 211 may (e.g., to provide all, or a portion, of the data collection services): (i) obtain a representation of data, (ii) determine if the representation of data falls outside a threshold, (iii) if the representation of data falls outside a threshold, transmit the representation of data to data aggregator 102, (iv) respond to commands received from data aggregator 102.

In an embodiment, data reduction manager 211 may obtain a representation of data. The representation of data may be at least a portion of live data from live data 213, a data statistic (e.g., an average) based on data from live data 213, and/or a difference based on: (i) live data from live data 213 and (ii) an inference obtained from a copy of a twin inference model hosted by data collector 100A. Representations of data may be obtained via other methods without departing from embodiments disclosed herein. Refer to operation 313 in FIG. 3D for additional details regarding obtaining representations of data.

In an embodiment, data reduction manager 211 may determine if the representation of data falls outside a threshold. A threshold may be intended to limit the amount of data transmitted over communication system 101 while ensuring that consumers have access to accurate data from data aggregator 102. A threshold may be a range of acceptable variation in data values and/or a maximum amount of bits allowed for transmissions. For example, a threshold may be ±10° C. In this scenario, a representation of data may be an average temperature measurement over the course of one hour. The average temperature measurement may be 80.5° C. The temperature sensor may host a copy of a twin inference model and may generate an inference for that hour of 78.0° C. Therefore, the inference of 78.0° C. may fall below the threshold of a 10° C. average temperature variation and the inference may be determined accurate. In this scenario, data reduction manager 211 may not transmit the average temperature measurement to data aggregator 102.

Continuing with the above example, data reduction manager 211 may transmit a representation of data to data aggregator 102 if the representation of data falls outside a threshold. As mentioned above, the threshold may be ±10° C. and the average temperature value for an hour may be 85.0° C. The inference generated by a copy of a twin inference model hosted by the data collector may be 66.0° C. Therefore, the inference may fall outside the threshold of a 10° C. average temperature variation and data reduction manager 211 may transmit some representation of the data to data aggregator 102. The representation of data may be the average temperature value, a difference between the average temperature value and the inference, or some other type of representation. By doing so, data aggregator 102 may access more accurate data regarding the operation of data collectors 100.

In a second scenario, the threshold may be a maximum of 5 bits of information transmitted over communication system 101. In this scenario, any representation of data containing less than 5 bits of information may fall below the threshold and may not be transmitted to data aggregator 102.

In contrast, any representation of data containing 5 or more bits of information may fall outside the threshold and the representation of data may be transmitted to data aggregator 102. Thresholds may be other types of thresholds (e.g., which may be determined based on the type of data structure used to represent the information) and data may be compared to thresholds via other methods without departing from embodiments disclosed herein.

In an embodiment, data reduction manager 211 may respond to commands received from data aggregator 102. In a first scenario, data aggregator 102 may provide data aggregator with updated thresholds for data transmissions. In a second scenario, data aggregator 102 may request at least a portion and/or representation of data based on measurements performed by data collectors 100 for purposes of training or retraining inference models (and/or other purposes).

In an embodiment, one or more of sensor 210 and data reduction manager 211 is implemented using a hardware device including circuitry. The hardware device may be, for example, a digital signal processor, a field programmable gate array, or an application specific integrated circuit. The circuitry may be adapted to cause the hardware device to perform the functionality of sensor 210 and/or data reduction manager 211. One or more of sensor 210 and data reduction manager 211 may be implemented using other types of hardware devices without departing from embodiments disclosed herein.

In an embodiment, one or more of sensor 210 and data reduction manager 211 is implemented using a processor adapted to execute computing code stored on a persistent storage that when executed by the processor performs the functionality of sensor 210 and/or data reduction manager 211 discussed throughout this application. The processor may be a hardware processor including circuitry such as, for example, a central processing unit or a microcontroller. The processor may be other types of hardware devices for processing digital information without departing from embodiments disclosed herein.

In an embodiment, sensor 210 and/or data reduction manager 211 may utilize a physical device (e.g., a sensor) used to measure a characteristic of an ambient environment in order to perform the functionality of sensor 210 and/or data reduction manager 211. For example, a temperature sensor may utilize one or more thermistors, thermocouples, and/or resistance temperature detectors to collect temperature data. In a second example, a pH sensor may utilize any number of electrodes to collect pH data. The sensor may include other types of hardware devices for measuring a characteristic of an ambient environment without departing from embodiments disclosed herein.

When providing their functionality, sensor 210 and data reduction manager 211 may perform all, or a portion, of the operations and/or actions discussed with respect to FIG. 3D.

When providing its functionality, data reduction manager 211 may store data and use data stored in storage 212.

In an embodiment, storage 212 is implemented using physical devices that provide data storage services (e.g., storing data and providing copies of previously stored data). The devices that provide data storage services may include hardware devices and/or logical devices. For example, storage 212 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 212 may include a memory device (e.g., a dual in line memory device) in which data is stored and from which copies of previously stored data are provided. In another example, storage 212 may include a persistent storage device (e.g., a solid-state disk drive) in which data is stored and from which copies of previously stored data is provided. In a still further example, storage 212 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 212 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 212 may store data structures including, for example, live data 213, representations of data 214, and thresholds 215. Any of these data structures is usable by components of the system in FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein. Each of these data structures is discussed below.

In an embodiment, live data 213 includes live data measurements collected by sensor 210. For example, live data 213 may include temperature measurements recorded by a temperature sensor at various time intervals. A series of temperature measurements may include the following five measurements taken over the course of one hour: $T_1=80.5°$ C., $T_2=80.0°$ C., $T_{3=79.5}°$ C., $T_4=85.0°$ C., $T_5=84.0°$ C. Any amount of measurements may be stored temporarily and/or permanently in live data 213 (and/or other locations). For example, some measurements may be removed while others may be added. Consequently, the contents of live data 213 may be updated over time to reflect more recent activity of data reduction manager 211.

In an embodiment, representations of data 214 may include any number or type of representations of data based on measurements performed by data collectors 100. Representations of data may include portions of collected data, data statistics (e.g., an average value), a difference (e.g., a difference between data and an inference), etc. The representations of data may be transmitted to data aggregator 102 if the representations of data fall outside a threshold (and/or for other reasons). Refer to operation 313 in FIG. 3D for additional details regarding obtaining representations of data.

In an embodiment, thresholds 215 may include any number of thresholds obtained by data reduction manager 211. Thresholds may be based on the sensitivities of consumers and data based on measurements performed by data collectors 100. The thresholds may be dynamic thresholds, may be set by a user, and/or may be obtained from another entity through a communication system (e.g., communication system 101). As described above, the thresholds may be based on a quantity of bits, a data range, and/or other criteria. Refer to operation 307 in FIG. 3B for additional details regarding thresholds.

While illustrated in FIG. 2B as including a limited number of specific components, a data collector in accordance with an embodiment may include fewer, additional, and/or different components than shown in FIG. 2B.

As discussed above, the components of FIG. 1 may perform various methods to utilize data aggregated from various sources throughout a distributed environment. FIGS. 3A-3E illustrate methods that may be performed by the components of FIG. 1. In the diagrams discussed below and shown in FIGS. 3A-3E, any of the operations may be repeated, performed in different orders, and/or performed in parallel with or in a partially overlapping in time manner with other operations.

Turning to FIG. 3A, a flow diagram illustrating a method of aggregating data in a distributed environment in accordance with an embodiment is shown.

At operation 300, the data aggregator may prepare for data aggregation. This preparation step may involve obtaining trained inference models, obtaining sensitivities from consumers, obtaining thresholds for data transmission, and distributing thresholds to data collectors 100. Refer to FIG. 3B for additional details regarding this preparation step.

At operation 301, the data aggregator may perform data aggregation. This step may involve determining, by the data aggregator, if an inference obtained by an inference model is accurate. If the inference is determined accurate, data aggregator 102 may store the inference as validated data. If the inference is determined inaccurate, data aggregator 102 may obtain a representation of data from data collectors 100 in order to obtain validated data. Refer to FIG. 3C for additional details regarding this data validation step.

Figure 3E:
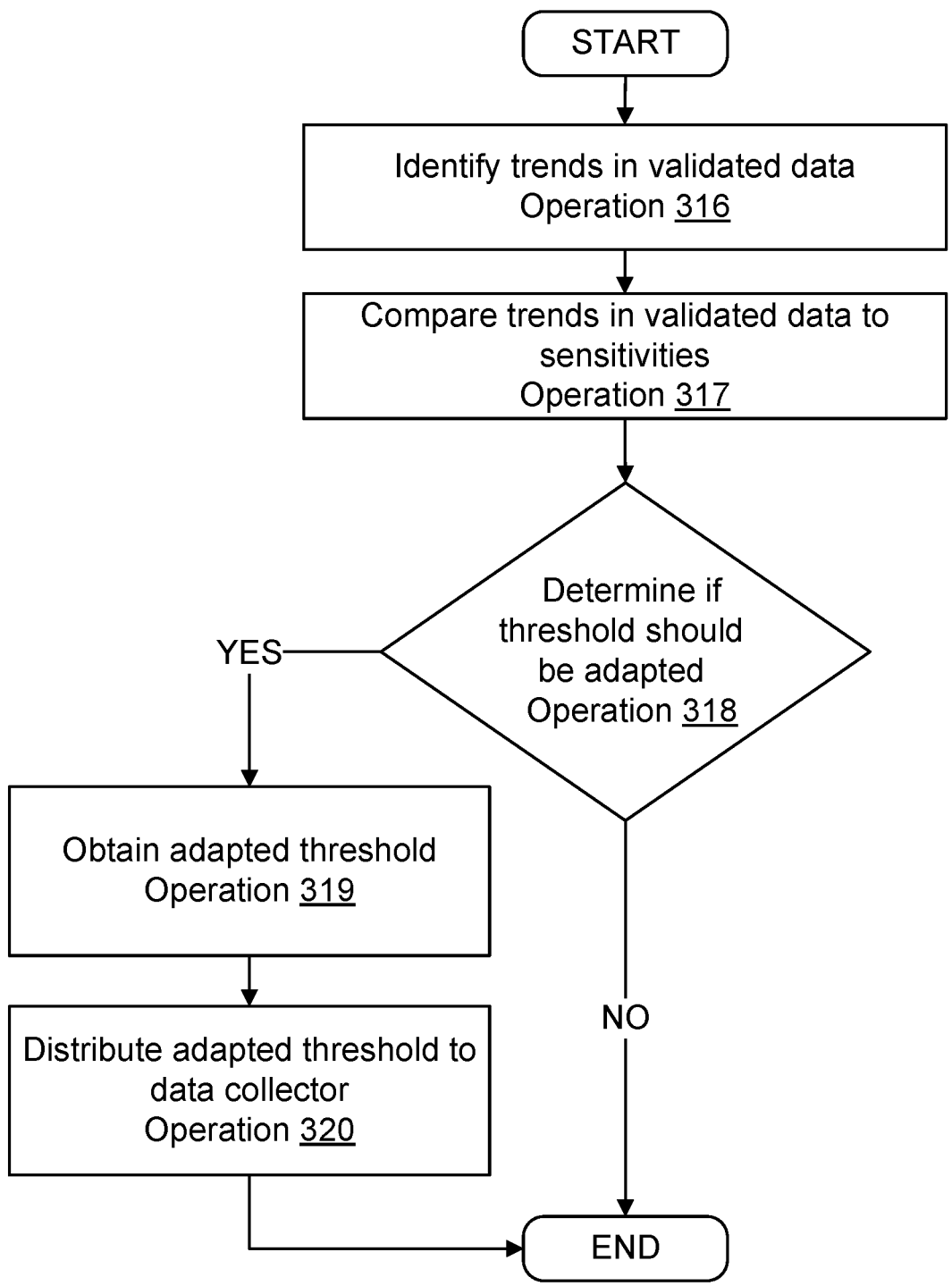
FIG. 3E shows a flow diagram illustrating a method of adapting a method of data aggregation in accordance with an embodiment.

At operation 302, the data aggregator may adapt the method of data aggregation. Adapting the method may involve determining if thresholds for data transmission may require modification based on trends in validated data and sensitivities from consumers. Refer to FIG. 3E for additional details regarding this adaptation step.

The method may end following operation 302.

Using the method shown in FIG. 3A, embodiment disclosed herein may facilitate reductions in data transmission for aggregation while increasing the likelihood that accurate data necessary for sensitive consumer of the data to provide their functions is aggregated and available.

Turning to FIG. 3B, a flow diagram illustrating a method of preparing for data aggregation in accordance with an embodiment is shown. The operations in FIG. 3B may be an expansion of operation 300 in FIG. 3A.

At operation 303, sensitivities may be obtained by data aggregator 102 from consumers (e.g., downstream applications) throughout a distributed environment. Consumers may initiate certain procedures in response to trends in validated data. Sensitivities may be keyed to conditions that, when met, may prompt a consumer to initiate a procedure. The conditions keyed to the sensitivities may be data values, data ranges, and/or other indicators that the time series relationship of the validated data may be approaching the sensitivities indicated by the consumer. Therefore, the operation of the consumer may change when a sensitivity is met. Refer to FIG. 2A for additional details regarding sensitivities.

In an embodiment, sensitivities may be obtained from any number of consumers throughout a distributed environment.

For example, requests for sensitivities may be sent to consumers and consumers may provide the sensitivities in response to the requests. Such requests and/or sensitivities may be passed via a communication system operably connecting the data aggregator and the consumers.

In an embodiment, sensitivities may be provided by another entity through a communication system. For example, the sensitivities may be obtained by an entity (e.g., a second data aggregator, a second set of consumers, etc.) throughout a second distributed environment with a similar environment. The sensitivities may be provided to any number of data aggregators in any number of distributed environments.

At operation 304, a training data set may be obtained by the data aggregator. The training data set may include any quantity and type of data. For example, the training data set may include a series of measurements representing an ambient environment (e.g., temperature data, humidity data, pH data).

In an embodiment, the training data set may be obtained from any number of data collectors (e.g., data collectors 100) throughout a distributed environment. For example, requests for the data may be sent to the data collectors and the data collectors may provide the data to the data aggregator in response to the requests. Such messages and/or data may be passed via a communication system operably connecting the data collector and the data aggregator.

In an embodiment, the training data set may be provided by another entity through a communication system. For example, the training data may be obtained by data collectors throughout a second distributed environment with a similar environment. This training data set may be provided to any number of data aggregators in any number of distributed environments.

At operation 305, an inference model may be obtained by the data aggregator. The inference model may be implemented with, for example, a machine learning model. The inference model may generate inferences that predict future data obtained by data collectors without having access to the data obtained by the data collectors.

In an embodiment, the inference model may be obtained by the data aggregator using a training data set. The training data set may be fed into a machine learning model (and/or other type of inference generation model) to obtain the inference model to predict future measurements from data collectors.

In an embodiment, the inference model may also be obtained from another entity through a communication system. For example, an inference model may be obtained by another entity through training a machine learning model and providing the trained machine learning model to the data aggregator. In this scenario, the inference model obtained via another entity may or may not require training by the data aggregator.

At operation 306, an inference may be obtained. The inference may be generated using the trained inference model. The inference may be a prediction of data based on measurements performed by a data collector throughout a distributed environment. The inference may be generated without the data aggregator having access to the measurements from the data collector.

In an embodiment, the inference may be generated by the inference model hosted by the data aggregator. In a second scenario, the inference may be generated by a copy of the inference model hosted by another entity (e.g., a second data aggregator) and transmitted to data aggregator 102 via a communication system (e.g., communication system 101).

At operation 307, a threshold may be obtained, the thresholds being based on the sensitivities of consumers and data based on measurements performed by data collectors 100 (e.g., the previously described training data). The thresholds may be dynamic thresholds, may be set by a user, and/or may be obtained from another entity through a communication system (e.g., communication system 101). Refer to FIG. 2A for additional details regarding obtaining thresholds.

At operation 308, copies of the thresholds may be distributed to sources (e.g., data collectors 100) throughout a distributed environment by data aggregator 102 via a communication system (e.g., communication system 101). Consequently, data collectors 100 and data aggregator 102 may have access to identical thresholds. For example, copies of the thresholds may be distributed to various data collectors by data aggregator 102 as part of the process of setting up a new distributed environment for data collection (and/or other purposes). In addition, a copy of the thresholds may be distributed to various data collectors by data aggregator 102 as part of the process of adding or replacing one or more data collectors in a distributed environment. Thresholds may be used to determine accuracy of inferences and facilitate data collection as described below.

The method may end following operation 308.

Turning to FIG. 3C, a flow diagram illustrating a method of performing data validation in accordance with an embodiment is shown. FIG. 3C may be a continuation of the method illustrated in FIG. 3B and the operations in FIG. 3C may be an expansion of operation 301 in FIG. 3A.

At operation 309, accuracy of an inference may be determined by data aggregator 102. In a first scenario, data aggregator 102 may receive a representation of data from data collectors 100. In this scenario, the inference may be determined inaccurate. In a second scenario, data aggregator 102 may receive no transmission from data collectors 100. In this second scenario, the inference may be determined accurate. Alternatively, data collectors 100 may transmit an acknowledgment to data aggregator 102 that the inference may be accurate. If the inference is determined inaccurate, the method may proceed to operation 310. If the inference is determined accurate, the method may proceed to operation 311.

For example, the threshold may be 5 bits. Therefore, any representation of data containing 5 bits or less may fall below the threshold. In this scenario, the representation of data may be a difference, the difference being a representation of the difference between data obtained by data collectors 100 and an inference obtained by a copy of a twin inference model hosted by data collectors 100. If the difference contains less than 5 bits of information, the difference between the inference and the data may be considered insignificant. In this scenario, no transmission may be received by data aggregator 102 and, therefore, data aggregator 102 may presume accuracy of the inference. In contrast, any difference containing more than 5 bits may fall outside the threshold. In this second scenario, the difference between the inference and the data may be considered significant. The data collector may transmit the difference to the data aggregator and, therefore, the data aggregator may determine the inference inaccurate. Thresholds may be implemented via other methods (e.g., the previously described data value range) without departing from embodiments disclosed herein.

At operation 310, data from data collectors 100 may be obtained and stored as validated data. In this scenario, an inference may be determined inaccurate and a representation of data may be provided by data collectors 100. In an embodiment, the representation of data may be a difference between data obtained by data collectors 100 and an inference obtained via a copy of a twin inference model hosted by data collectors 100. Data aggregator 102 may reconstruct data from data collectors 100 using: (i) the difference obtained from data collectors 100 and (ii) an inference obtained via a copy of the twin inference model hosted by the data aggregator. The inference used to reconstruct the data may be identical to the inference used to obtain the difference. By doing so, data aggregator may reconstruct identical (or substantially similar) data and store the data as validated data. Data from data collectors 100 may be reconstructed or obtained via other methods without departing from embodiments disclosed herein. In contrast, inferences may be determined accurate as described below.

At operation 311, inferences may be stored as validated data. In this scenario, an inference may be determined accurate and a representation of data may not be provided by data collectors 100. Data aggregator 102 may receive no transmission or data aggregator may receive an acknowledgment from data collectors 100 indicating that the inference may be accurate. Data aggregator may then store an inference intended to match data based on measurements obtained by data collectors 100 as validated data.

At operation 312, inferences may be discarded. Inferences may be discarded by data aggregator 102 following the process of data collection via validation of data and/or inferences in order to reduce storage consumption by data aggregator 102.

The method may end following operation 312.

Turning to FIG. 3D, a flow diagram illustrating a method of transmitting representations of data in accordance with an embodiment is shown.

At operation 313, a data collector (e.g., data collector 100A) may determine whether a representation of data falls outside a threshold. A representation of data may be at least a portion of a series of measurements, a data statistic (e.g., an average), and/or a difference between data and an inference intended to match the data. Representations of data may be other representations without departing from embodiments disclosed herein.

For example, the representation of data may be a difference. A difference may be any reduced-size representation of data based on: (i) a measurement performed by a data collector (e.g., data collector 100A) and (ii) an inference obtained by the data collector (e.g., data collector 100A). The inference used to obtain the difference may be generated by a copy of a twin inference model hosted by the data collector (e.g., data collector 100A) and obtained from data aggregator 102 (and/or from other sources). The inference used to obtain the difference may be intended to match the data obtained via a measurement performed by a data collector (e.g., data collector 100A).

Continuing with the above example, one data collector may be a temperature sensor positioned in an industrial environment to monitor the temperature of that environment. The data collector may perform a measurement and collect a temperature reading at a given time ($t_1$) of 85.0° C. The data collector may obtain a temperature inference using a copy of a twin inference model intended to predict the temperature reading at $t_1$ performed by the temperature sensor. The temperature inference obtained by the temperature sensor may be 78.5° C.

In order to decrease the amount of bits needed to represent the data, the temperature sensor may perform a data minimization step. One example of a data minimization step may be data compression. For example, different binary sequences may compress to different numbers of bits. The temperature reading may have the following binary sequence: 11010011. Compressing the temperature reading binary sequence may result in 8 bits of information transmitted over communication system 101. The temperature inference may have the following binary sequence: 10010011. Compressing the temperature inference may also result in 8 bits of information transmitted over communication system 101. In order to reduce the size of the transmission, the temperature sensor may utilize the following formula to generate a temperature difference binary sequence: temperature difference binary sequence=temperature reading binary sequence—temperature inference binary sequence (e.g., bit-wise difference operation). Therefore, the temperature sensor may calculate the temperature difference binary sequence as 01000000. Compressing the temperature difference binary sequence may result in 3 bits of information transmitted over communication system 101. Therefore, data manager 200 may obtain 3 bits of information rather than 8 from the temperature sensor during data collection. Consequently, the amount of data transmitted over communication system 101 may be minimized and, therefore, network bandwidth and power consumption may be reduced. Differences may be obtained via other methods without departing from embodiments disclosed herein.

In an embodiment, the threshold may be 5 bits. Continuing with the above example, the representation of data may include 3 bits of information and, therefore, may fall below the threshold. In this scenario, the data collector may not transmit the representation of data to data aggregator 102 and the method may proceed to operation 315.

In an embodiment, data collectors 100 may transmit an acknowledgement to data aggregator 102 that the representation of data falls below a threshold. This acknowledgement may prompt data aggregator 102 to determine an inference accurate, the inference being intended to match data obtained by the data collector At operation 314, the representation of data may fall outside a threshold. In this scenario, the representation of data may be transmitted to data aggregator 102. The representation of data may be transmitted in order to allow consumers of validated data to access more accurate validated data for downstream applications.

At operation 315, the representation of data may be discarded. Representations of data may be discarded by data collectors 100 in order to reduce storage consumption by data collectors 100.

The method may end following operation 315.

Turning to FIG. 3E, a flow chart illustrating a method of adapting a method of data aggregation in accordance with an embodiment is shown. The operations in FIG. 3E may be an expansion of operation 302 in FIG. 3A.

At operation 316, trends may be identified in the validated data. Validated data may include data obtained from data collectors, inferences, reconstructed data, etc. and validated data may be intended for consumption by downstream applications (e.g., consumers). Data aggregator 102 and/or data collectors 100 may monitor validated data to identify trends that may impact the operation of consumers.

For example, validated data may include a time series relationship of average temperature measurements taken in an industrial environment and the consumer of the validated data may be a temperature control system. Data aggregator 102 and/or data collectors 100 may monitor the time series relationship of the validated temperature data to identify trends that may impact the operation of the temperature control system. In one scenario, the average temperature measurements may begin to steadily increase. The increasing average temperature may be considered a trend in the validated data. Data aggregator 102 and/or data collectors 100 may utilize data trends in order to determine if the operation of a consumer may need to change as described below.

At operation 317, the trends in validated data may be compared to the sensitivities. Sensitivities may be keyed to conditions (e.g., data values and/or data ranges) of significant importance to the operation of downstream consumers of the validated data. The operation of the consumer may change (e.g., an action may be initiated) if the validated data reaches the sensitivity. For example, a consumer may be a temperature control system programmed to maintain the temperature of an environment below 95° C. In order to ensure that the temperature does not reach and/or exceed 95° C., the temperature control system may begin cooling the environment when the temperature of the environment reaches 85° C. Therefore, 85° C. may be the condition keyed to the sensitivity for the temperature control system. In this scenario, validated data may be monitored by the data collectors and/or the data aggregator to determine if the validated data reaches the sensitivity. If the validated data reaches the sensitivity, the consumer may also require more accurate validated data and, therefore, more frequent data transmissions from data collectors until the sensitivity is no longer reached. A method of determining whether to change the frequency of data transmissions is described below.

At operation 318, it may be determined whether a threshold should be adapted. The threshold may be based on the sensitivities of consumers and data based on measurements performed by data collectors 100. The threshold may be set by a user, and/or may be obtained from another entity through a communication system (e.g., communication system 101). Refer to FIG. 2A for additional details regarding thresholds.

In an embodiment, thresholds may be adapted in order to modify the accuracy of validated data. Thresholds may be lowered in order to allow a narrower range of inferences to be considered accurate and, therefore, representations of data may be transmitted more frequently. In this scenario, inferences may be less likely to be stored as validated data and a higher volume of data may be transmitted via communication system 101. In a second scenario, thresholds may be raised in order to allow a wider range of inferences to be considered accurate and, therefore, representations of data may be transmitted less frequently. In this second scenario, inferences may be more likely to be stored as validated data and a lower volume of data may be transmitted via communication system 101. If it is determined that the thresholds may not require adapting, the method may end following operation 318. If it is determined that the thresholds may require adapting, the method may proceed to operation 319.

At operation 319, one or more adapted thresholds may be obtained. Adapted thresholds may be obtained in order to increase or decrease the accuracy of the validated data. Accuracy of validated data may require increasing if the validated data exhibits a trend that indicates the validated data may match the sensitivity indicated by the consumer. In a scenario where validated data does not match a sensitivity indicated by the consumer, data aggregator 102 and/or data collectors 100 may be able to decrease network communications by raising the threshold and transmitting data less frequently.

In an embodiment, data aggregator 102 may obtain one or more adapted thresholds by monitoring validated data stored by data aggregator 102. Data aggregator 102 may also obtain one or more adapted thresholds from another entity (e.g., a second data aggregator) over a communication system. The second data aggregator may aggregate similar data from a similar distributed environment.

At operation 320, copies of adapted thresholds may be distributed to data collectors 100 throughout a distributed environment by data aggregator 102 via communication system 101. Consequently, data collectors 100 and data aggregator 102 may have access to identical adapted thresholds. Copies of adapted thresholds may be distributed to data collectors 100 in order to modify the frequency of data transmissions from data collectors 100. An increased threshold may decrease the frequency of data transmissions while a decreased threshold may increase the frequency of data transmissions.

The method may end following operation 320.

Turning to FIGS. 4A-4H, these figures may illustrate a system similar to that of FIG. 1 in accordance with an embodiment. FIGS. 4A-4H may show actions performed by the system over time. The system may include potential of hydrogen (pH) sensor 400, reaction vessel monitoring system 401, and pH control system 402. pH sensor 400, reaction vessel monitoring system 401, and pH control system 402 may be operably connected via communication system 101. Communication system 101 may include limited communication bandwidth and may serve a large number of different components (not shown). Consequently, it may be desirable to limit communications between pH sensor 400, reaction vessel monitoring system 401, and pH control system 402 to efficiently marshal the limited communication bandwidth so that it is less likely that components of the system are impaired for lack of access to communication bandwidth.

Figure 4A:
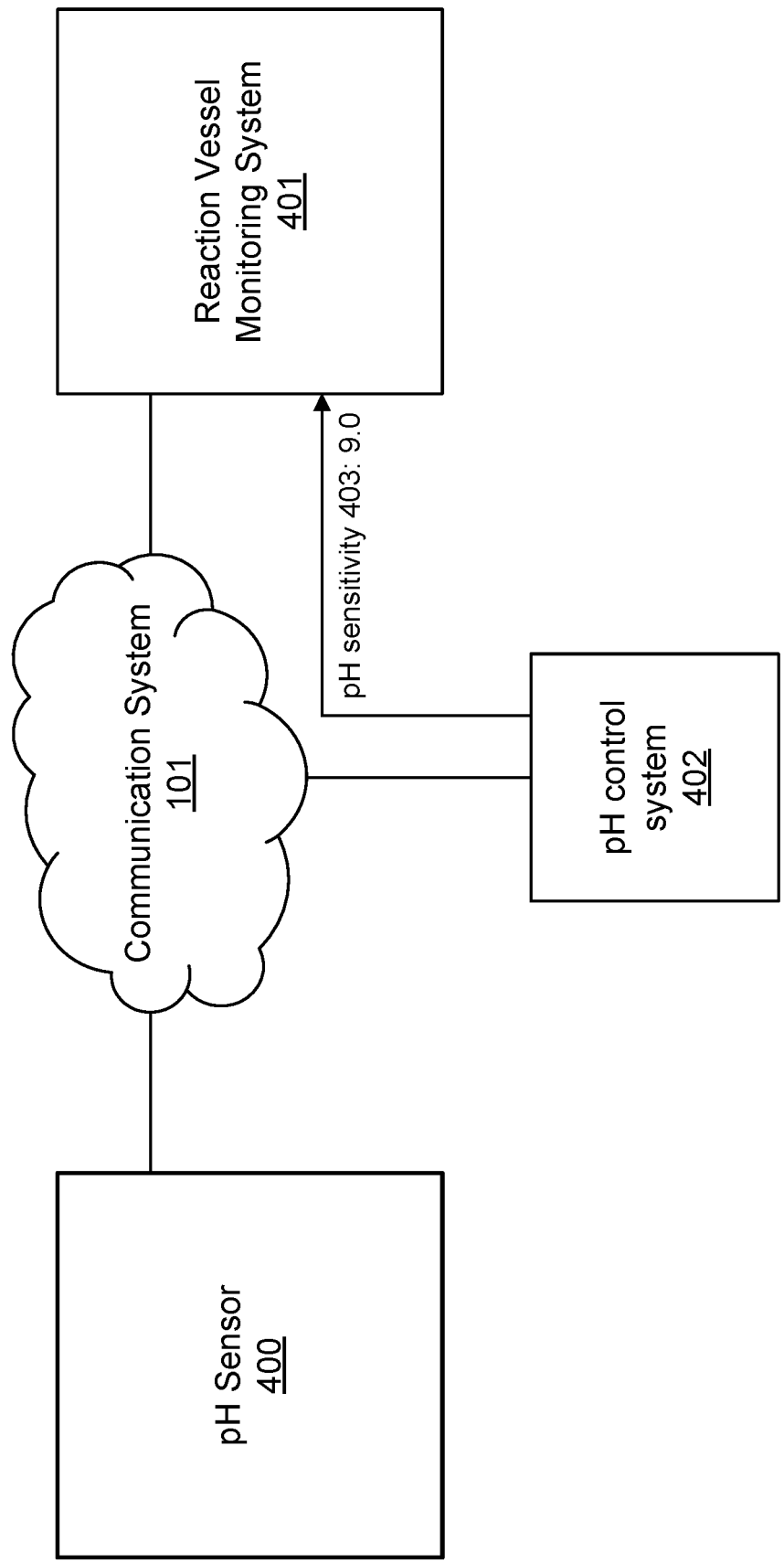
FIGS. 4A-4H show block diagrams illustrating a system in accordance with an embodiment over time.

Turning to FIG. 4A, consider a scenario where pH control system 402 provides pH sensitivity 403 to reaction vessel monitoring system 401. pH sensitivity 403 may include the pH value of 9.0 (e.g., on a scale of 0 to 14 with a score of 7 indicating neutrality, scores below 7 indicating acidity, and scores above 7 indicating base conditions). This sensitivity may be based on the requirements of a reaction vessel to perform a given chemical reaction. For example, the chemical reaction may not proceed if the pH of the solution reaches 10.0. Therefore, pH sensitivity 403 of 9.0 may prompt pH control system 402 to initiate an action set when the pH of a reaction vessel reaches 9.0. The action set may include introducing a reagent in order to lower the pH of the solution.

Figure 4B:
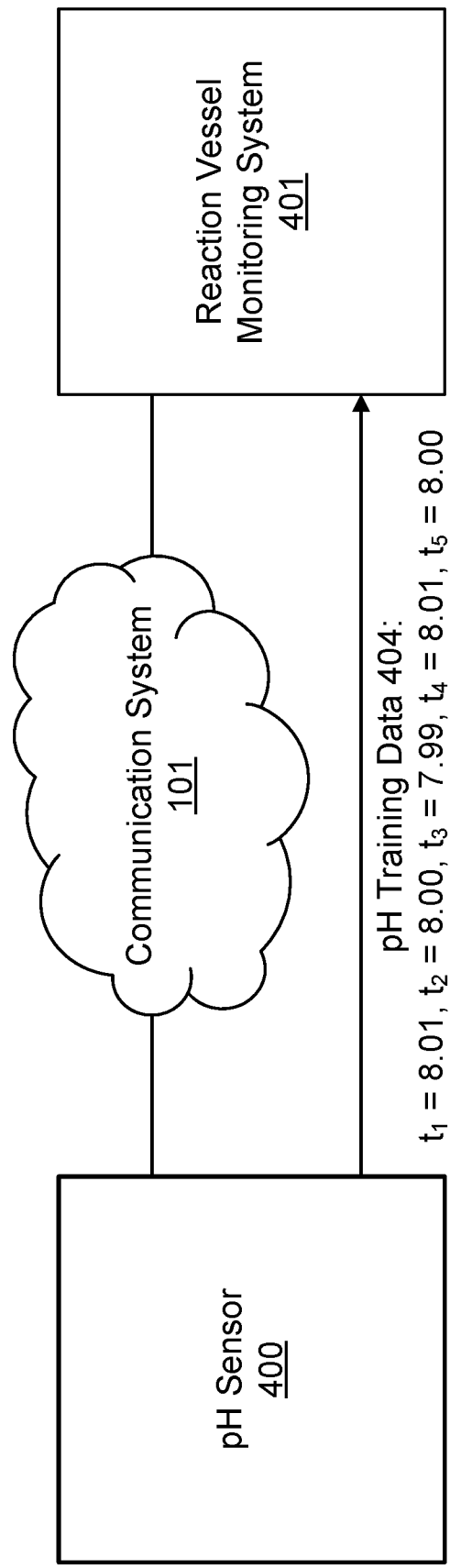

Turning to FIG. 4B, pH sensor 400 may collect pH training data 404 from a reaction vessel. pH training data 404 may be collected at various time intervals (e.g., $t_1$, $t_2$, etc.) over the course of one hour and may include the following: $t_1$=8.01, $t_2$=8.00, $t_3$=7.99, $t_4$=8.01, $t_5$=8.00. Reaction vessel monitoring system 401 may obtain pH training data 404 for the purpose of training a twin inference model to predict future pH measurements obtained by pH sensor 400.

Figure 4C:
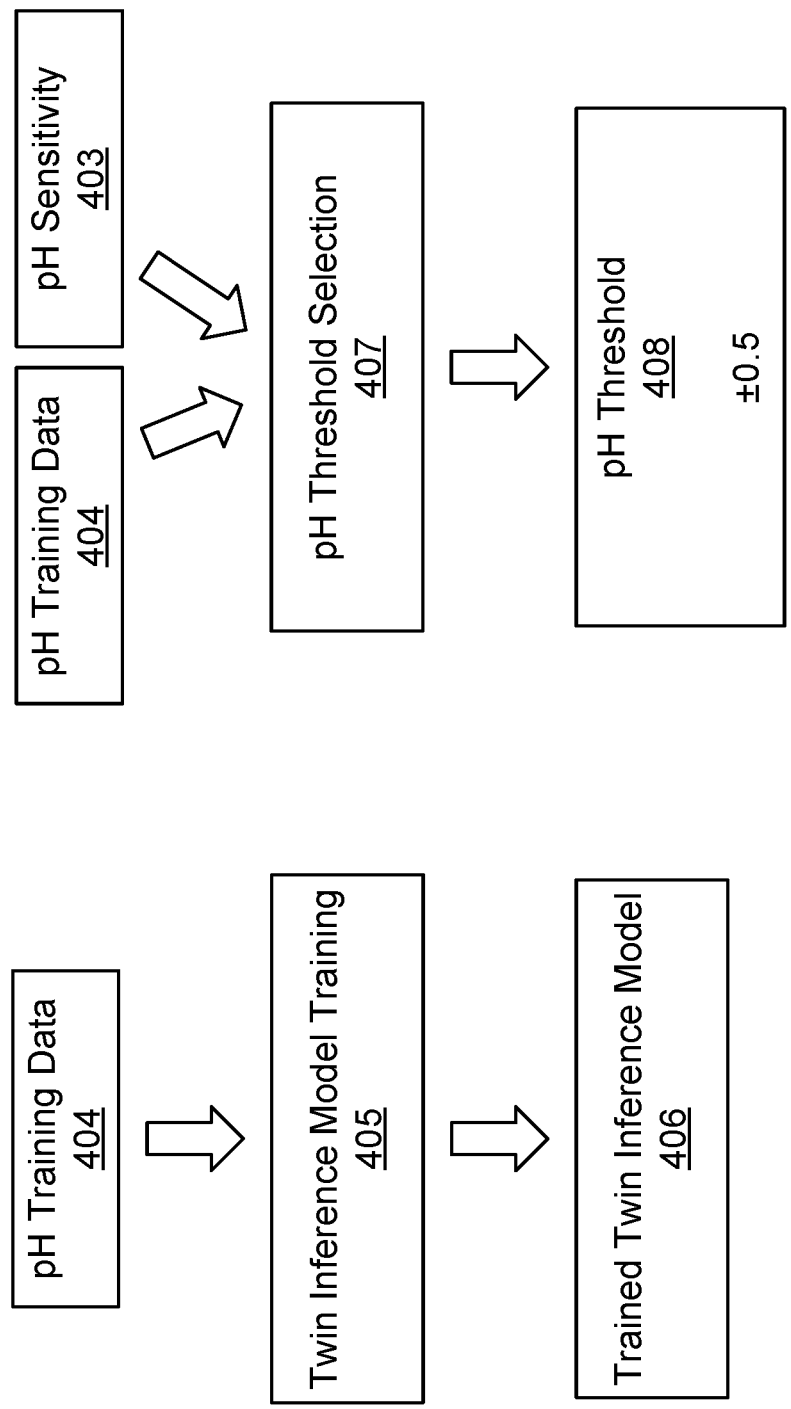

Reaction vessel monitoring system 401 may train a twin inference model based on pH training data 404 and obtain a pH threshold based on pH training data 404 and pH sensitivity 403. Turning to FIG. 4C, a twin inference model training 405 process is illustrated on the left-hand side of the figure and a pH threshold selection 407 process is illustrated on the right-hand side of the figure. pH training data 404 may be used to perform a twin inference model training 405 process to obtain the trained twin inference model 406. pH training data 404 and pH sensitivity 403 may be used to perform a pH threshold selection 407 process to obtain pH threshold 408 of ±0.5. For example, reaction vessel monitoring system 401 may perform portions of the methods illustrated in FIGS. 3A and 3B to obtain trained twin inference model 406 and pH threshold 408.

Figure 4D:
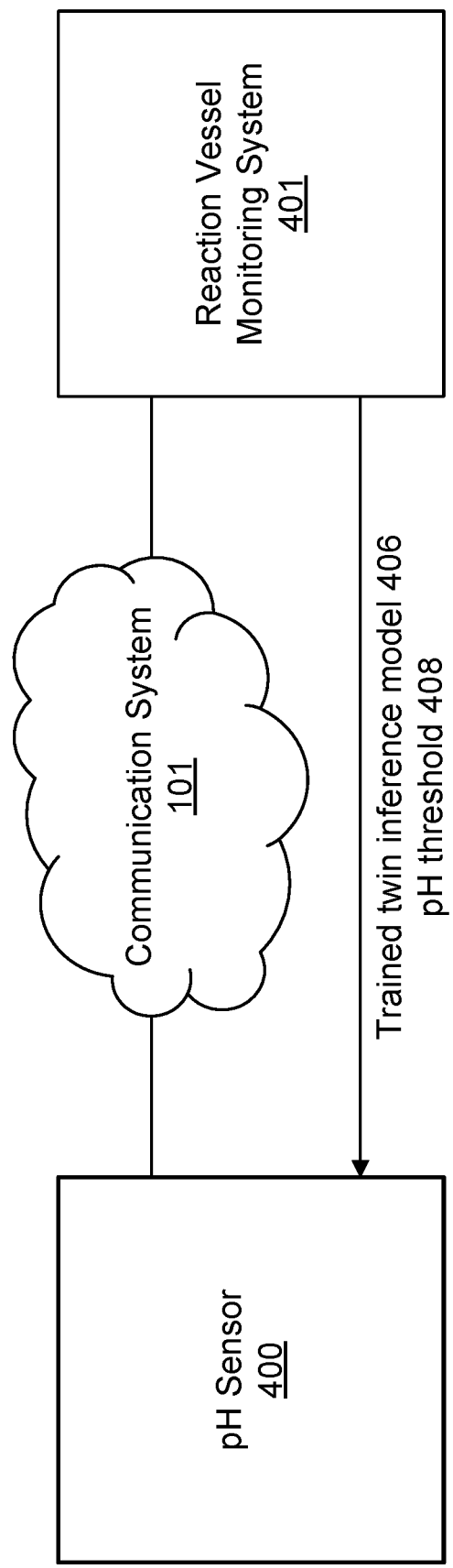

Turning to FIG. 4D, reaction vessel monitoring system 401 may distribute a copy of the trained twin inference model 406 and pH threshold 408 to pH sensor 400. A second copy of the trained twin inference model 406 and pH threshold 408 may be hosted by reaction vessel monitoring system 401. Therefore, pH sensor 400 and reaction vessel monitoring system 401 may have access to identical thresholds and identical inferences generated by each copy of the twin inference model as described below.

Figure 4E:
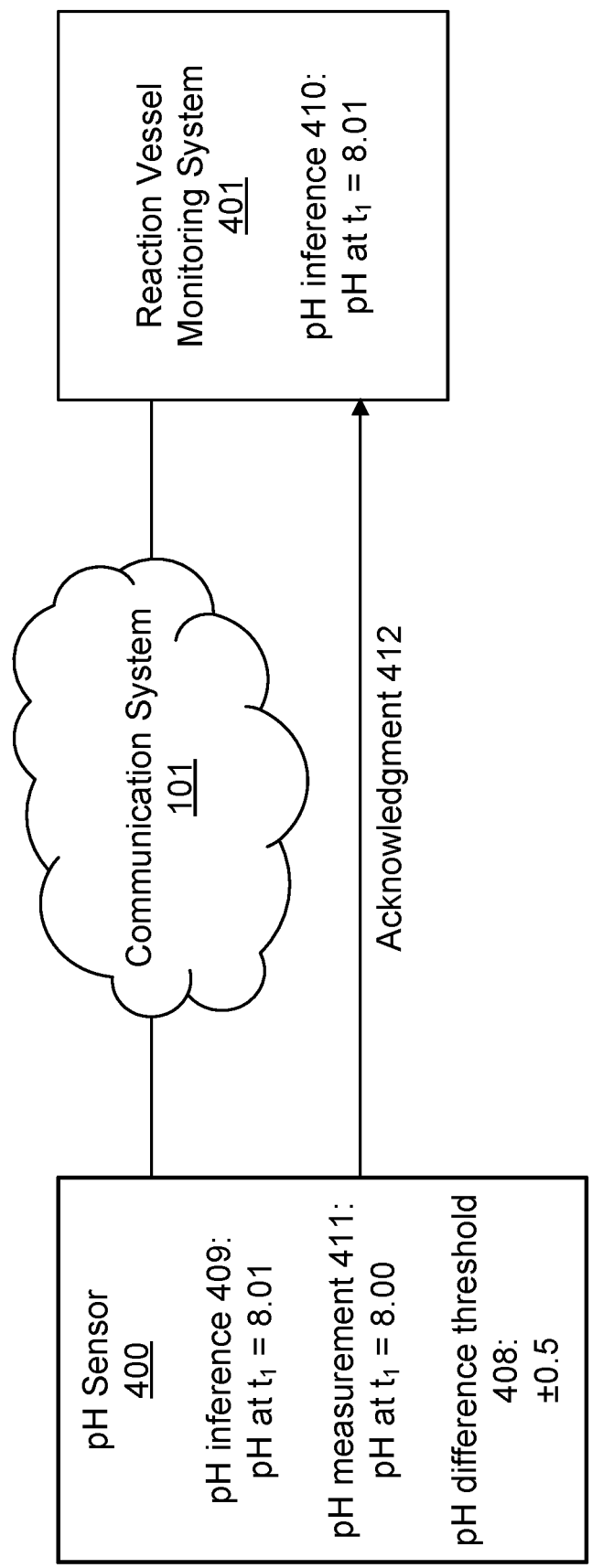

Turning to FIG. 4E, pH sensor 400 and reaction vessel monitoring system 401 may obtain identical pH inferences (e.g., pH inference 409 and pH inference 410) at a given time. The pH inferences may be predictions of pH measurements performed by pH sensor 400. At $t_1$, the copy of the twin inference model hosted by pH sensor 400 may generate pH inference 409 of 8.01. At $t_1$, the copy of the twin inference model hosted by the data aggregator may generate pH inference 410 of 8.01. pH sensor 400 and reaction vessel monitoring system 401 may both access this inference without transmitting the inference via communication system 101.

pH sensor 400 may obtain pH measurement 411. The pH measurement 411 may be taken at $t_1$ and the previously described pH inference 409 may be intended to match this pH measurement 411. The pH measurement 411 at $t_1$ may be 8.00. Therefore, pH sensor 400 may determine pH inference 409 accurate, as the difference between the pH measurement 411 and the pH inference 409 may fall below the pH threshold 408 of ±0.5.

pH sensor 400 may provide an acknowledgement 412 to reaction vessel monitoring system 401 that the inference may be determined accurate. In this scenario, reaction vessel monitoring system may store pH inference 410 as validated data. Alternatively, an inference may be determined inaccurate as described below.

Figure 4F:
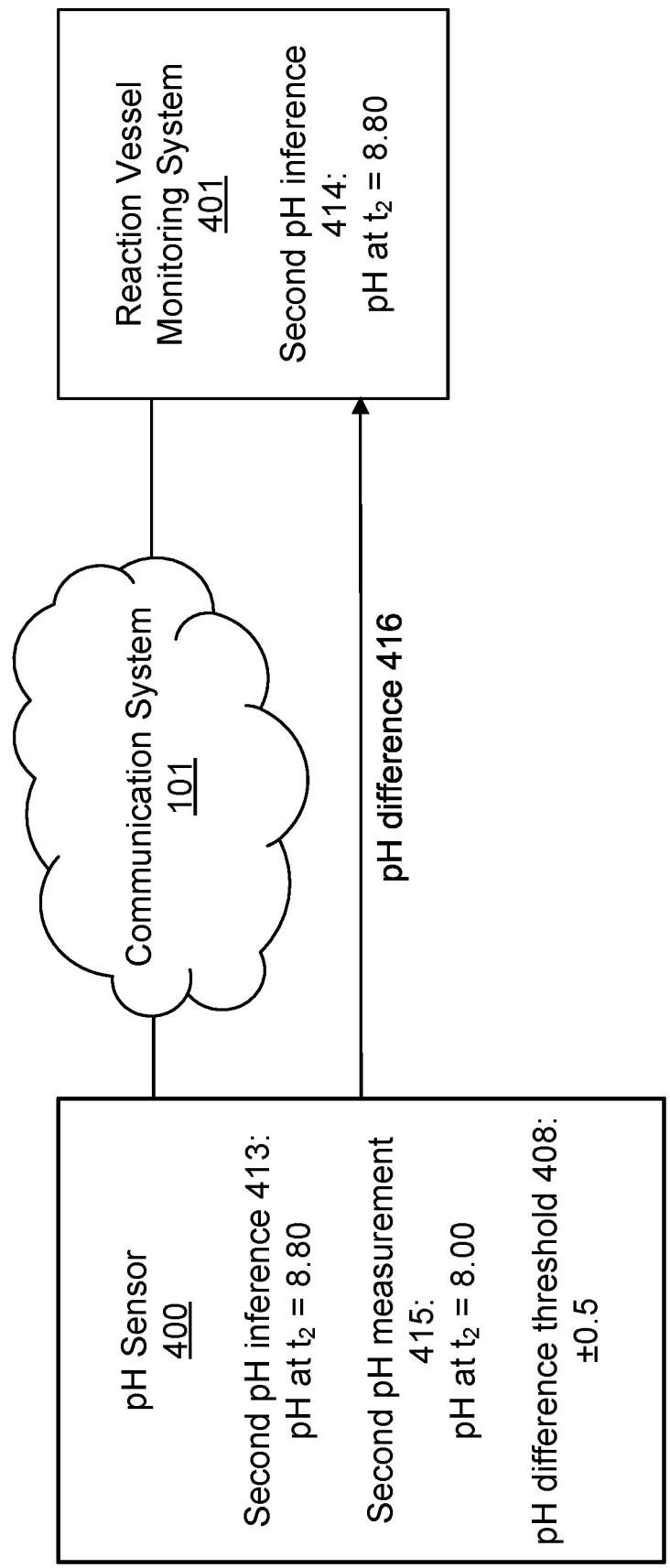

Turning to FIG. 4F, pH sensor 400 may obtain second pH measurement 415. The second pH measurement 415 may be taken at $t_2$ and a second pH inference 413 of 8.80 may be intended to match second pH measurement 415. The second pH measurement 415 at $t_2$ may be 8.00. Therefore, pH sensor 400 may determine second pH inference 413 inaccurate, as the difference between second pH measurement 415 and second pH inference 413 may fall outside the pH threshold 408 of ±0.5.

pH sensor 400 may generate pH difference 416 as a reduced-size representation of second pH measurement 415 in order to decrease the amount of data transmitted across communication system 101. pH difference 416 may be based on: (i) second pH measurement 415 and (ii) second pH inference 413. pH difference 416 may be obtained via a bit-wise difference operation, a value difference operation, and/or other methods. Transmitting less data via communication system 101 may result in a reduction in network bandwidth consumption and/or a reduction in power consumption by pH sensor 400 due to data transmission.

Reaction vessel monitoring system 401 may obtain pH difference 416 from pH sensor 400. pH difference 416 may be reconstructed as data based on measurements performed by pH sensor 400 and stored as validated data. Reaction vessel monitoring system 401 may reconstruct data using: (i)

the pH difference 416 and (ii) the second pH inference 414. By doing so, the bandwidth use of communication system 101 may be reduced by not needing to carry information regarding the second pH measurements 415 from pH sensor 400 to reaction vessel monitoring system 401 while reaction vessel monitoring system 401 is still able to operate as though it had access to second pH measurements 415. See operations 309-311 in FIG. 3C for additional details regarding obtaining validated data.

Figure 4G:
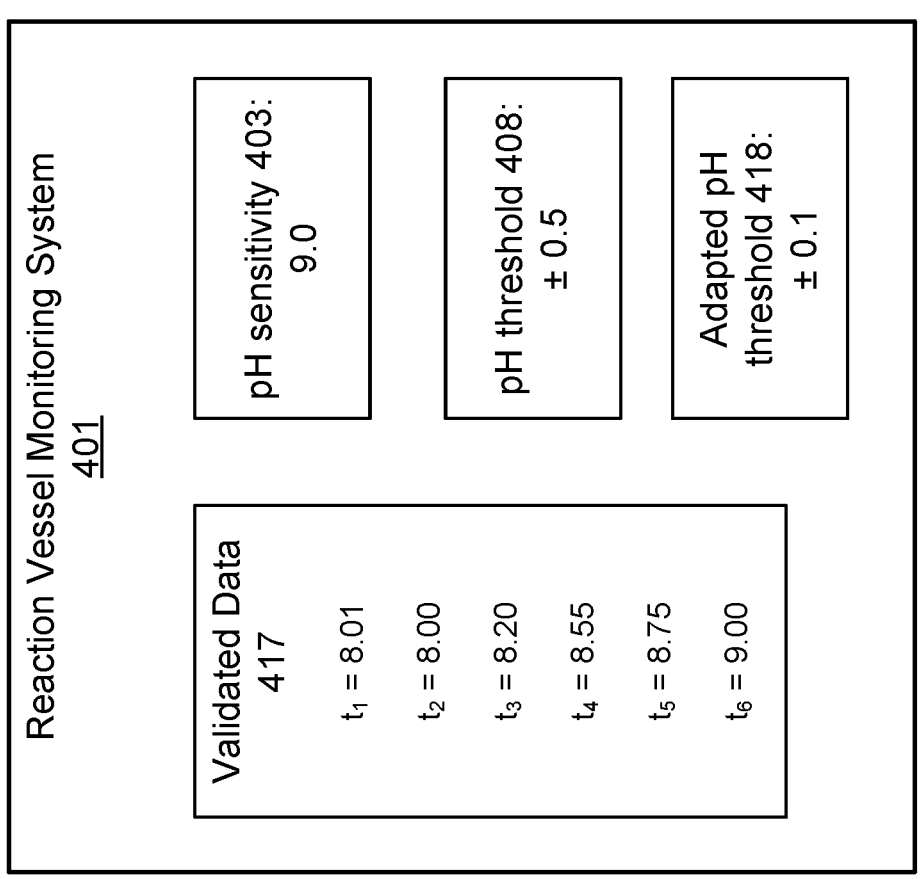

Turning to FIG. 4G, reaction vessel monitoring system 401 may monitor trends in validated data 417. Validated data 417 may include measurements performed by pH sensor 400 and/or inferences generated by the copy of the trained twin inference model hosted by reaction vessel monitoring system 401. Validated data 417 may include a time series of pH measurements at different times (e.g., $t_1$, $t_2$, $t_3$, etc.). Over time, the pH measurements in validated data 417 may increase and this increase may be identified as a trend.

Reaction vessel monitoring system 401 may monitor trends in validated data to identify when validated data 417 may reach pH sensitivity 403. For example, at $t_6$, the pH measurement of 9.00 may signify that the validated data 417 may have reached pH sensitivity 403. As previously described with reference to FIG. 4A, pH sensitivity 403 may be keyed to a condition (e.g., a pH value of 9.00). When this condition is met, pH control system 402 may perform an action set in order to lower the pH of the reaction vessel. Therefore, at $t_6$, the sensitivity may be met and the pH control system may begin lowering the pH of the reaction vessel.

At this time, pH control system 402 may require access to more accurate validated data in order to ensure the pH of the reaction vessel does not reach 10.0 (previously mentioned as the pH at which the reaction no longer proceeds in reference to FIG. 4A). In order to provide more accurate data to pH control system 402, reaction vessel monitoring system 401 may obtain adapted pH threshold 418 of ±0.1. Adapted pH threshold 418 may be distributed to pH sensor 400. Lowering the threshold may increase transmissions of differences from pH sensor 400 by determining a narrower range of inferences accurate. Therefore, pH control system 402 may consume highly accurate data while performing the pH-lowering action.

Figure 4H:
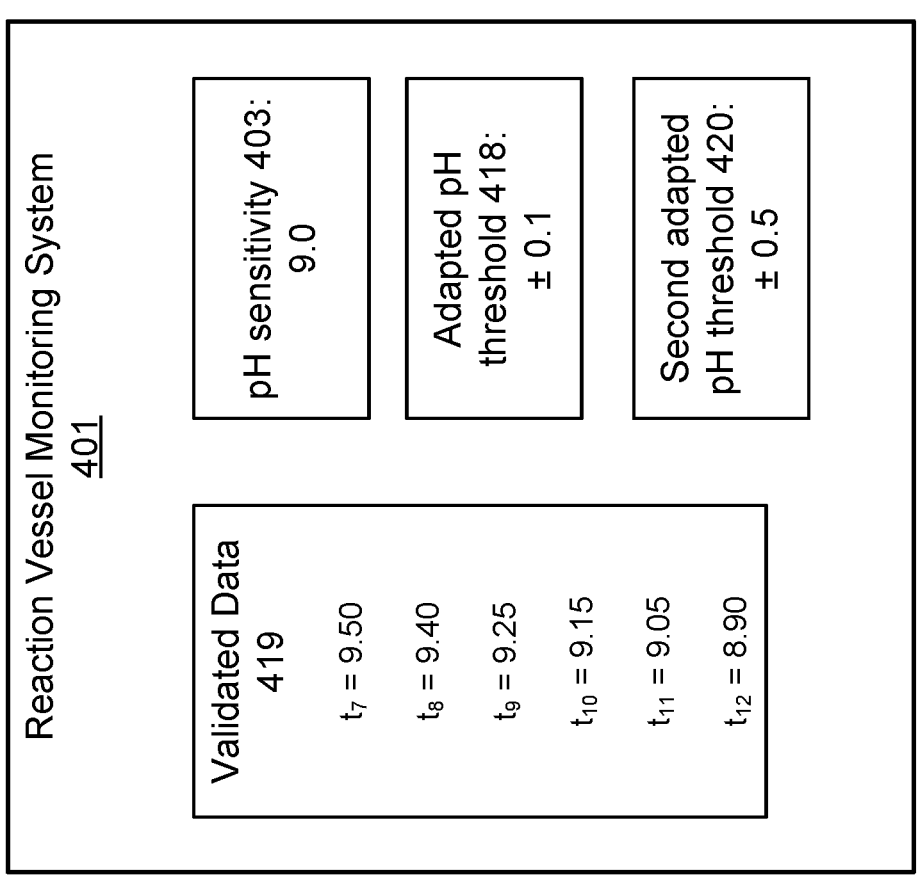

Turning to FIG. 4H, validated data 419 may include a continuation of the time series relationship of validated data 417. The pH measurements in validated data 419 may decrease over time and, therefore, display a second data trend. Validated data 419 may no longer reach pH sensitivity 403 at $t_{12}$, where the pH measurement may be 8.90. In this scenario, reaction vessel monitoring system may obtain second adapted threshold 420 of ±0.5. Second adapted threshold 420 may also be distributed to pH sensor 400. Raising the threshold may decrease transmissions of differences from pH sensor 400 by determining a wider range of inferences accurate. By doing so, the amount of data transmitted over communication system 101 may be reduced during data aggregation.

Figure 5:
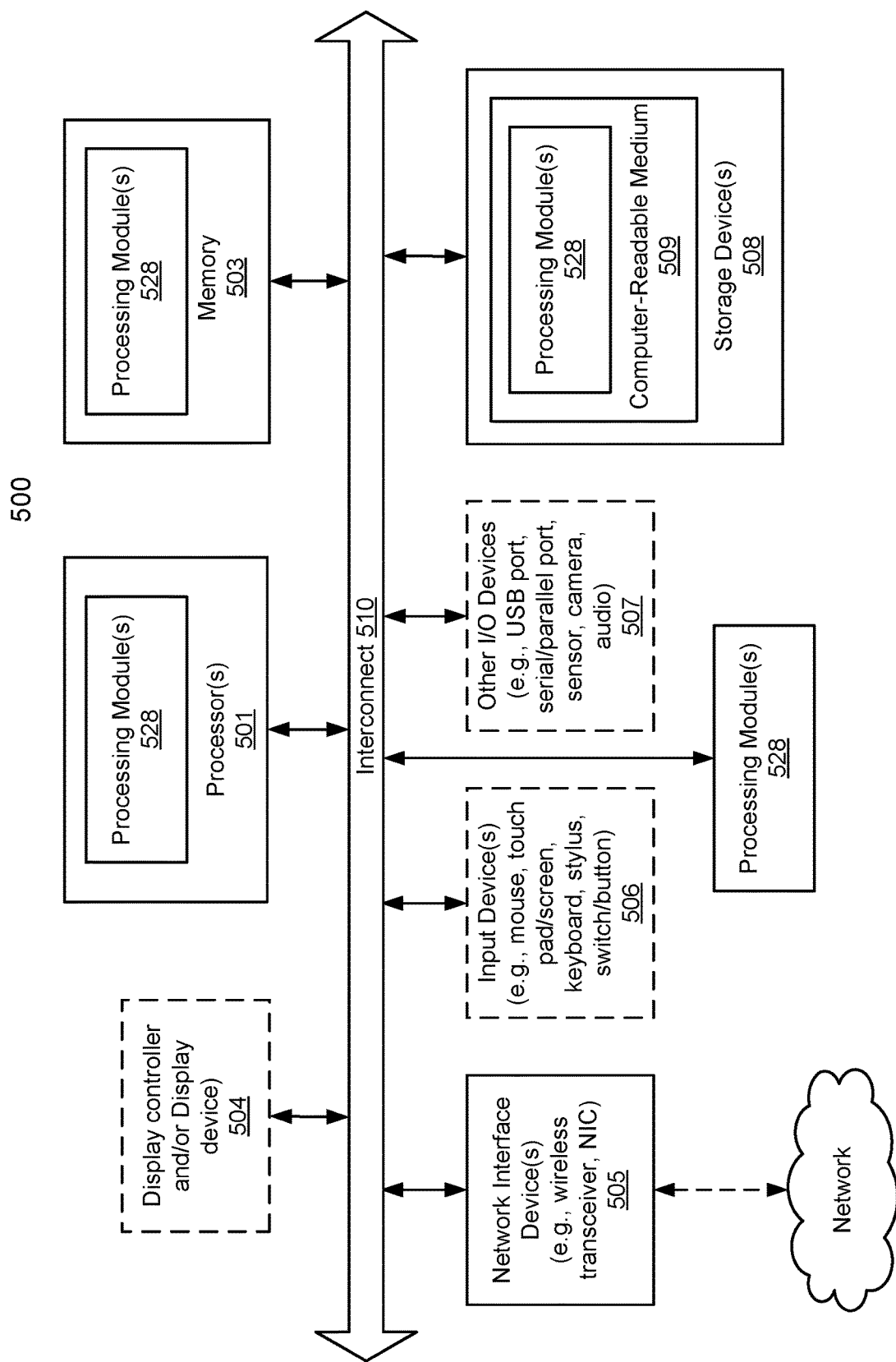
FIG. 5 shows a block diagram illustrating a data processing system in accordance with an embodiment.

Any of the components illustrated in FIGS. 1-4H may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include 10 devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data collection in a distributed environment where data is collected in a data aggregator of the distributed environment and from a data collector operably connected to the data aggregator via a communication system, the method comprising:
    obtaining, by the data aggregator, a portion of validated data, the portion of validated data increases a duration of a time series relationship represented by the validated data;
    making a determination, by the data aggregator, that a data trend in the validated data has occurred based at least in part on the portion of the validated data and a sensitivity of a consumer of the validated data, the sensitivity of the consumer being based on a change in operation of the consumer which is keyed to a characteristic of the time series relationship;
    obtaining, by the data aggregator, an updated threshold based on the data trend, the updated threshold being likely to increase a rate of data transmission from the data collector to the data aggregator;
    enforcing, by the data aggregator, the updated threshold on a data collector associated with the portion of the validated data.

2. The method of claim 1, further comprising:
    obtaining, by the data aggregator, a second portion of the validated data, the second portion of validated data further increases the duration of the time series relationship represented by the validated data;
    making a second determination, by the data aggregator, that a second data trend in the validated data has occurred based at least in part on the second portion of the validated data and the sensitivity of the consumer of the validated data;
    obtaining, by the data aggregator, a second updated threshold based on the second data trend, the second updated threshold being likely to decrease the rate of the data transmission from the data collector to the data aggregator;
    enforcing, by the data aggregator, the second updated threshold on the data collector.

3. The method of claim 2, wherein the second updated threshold is smaller than the updated threshold.

4. The method of claim 3, wherein the updated threshold specifies when representations of measurements obtained by the data collector are to be provided to the data aggregator.

5. The method of claim 4, wherein the data trend indicates that the measurements obtained by the data collector are likely to meet the keyed characteristic of the time series relationship.

6. The method of claim 5, wherein the second data trend indicates that the measurements obtained by the data collector are unlikely to meet the keyed characteristic of the time series relationship.

7. The method of claim 1, further comprising:
    prior to obtaining the portion of the validated data:
        evaluating changes in operation of the consumer to identify the characteristic of the time series relationship associated with the change in the operation of the consumer;
        generating a threshold based on the identified characteristic; and
        deploying the threshold to the data collector.

8. The method of claim 7, wherein the consumer comprises an application that initiates a procedure in response to the characteristic of the time series relationship meeting a condition.

9. The method of claim 1, wherein the data transmission from the data collector comprises a difference between an inference generated by the data collector and a value obtained by a measurement performed by the data collector, and the difference being usable to reconstruct the value using a copy of the inference generated by the data aggregator.

10. The method of claim 9, wherein the threshold indicates a size of the difference that must be exceeded for the difference to be transmitted to the data aggregator, and the difference being discarded without transmission when the size of the difference does not exceed the threshold.

11. A non-transitory machine-readable medium having instructions stored therein, which when executed by a processor, cause the processor to perform operations for managing data collection in a distributed environment where data is collected in a data aggregator of the distributed environment and from a data collector operably connected to the data aggregator via a communication system, the operations comprising:
    obtaining, by the data aggregator, a portion of validated data, the portion of validated data increases a duration of a time series relationship represented by the validated data;
    making a determination, by the data aggregator, that a data trend in the validated data has occurred based at least in part on the portion of the validated data and a sensitivity of a consumer of the validated data, the sensitivity of the consumer being based on a change in operation of the consumer which is keyed to a characteristic of the time series relationship;

obtaining, by the data aggregator, an updated threshold based on the data trend, the updated threshold being likely to increase a rate of data transmission from the data collector to the data aggregator;

enforcing, by the data aggregator, the updated threshold on a data collector associated with the portion of the validated data.

12. The non-transitory machine-readable medium of claim 11, wherein the operations further comprise:

obtaining, by the data aggregator, a second portion of the validated data, the second portion of validated data further increases the duration of the time series relationship represented by the validated data;

making a second determination, by the data aggregator, that a second data trend in the validated data has occurred based at least in part on the second portion of the validated data and the sensitivity of the consumer of the validated data;

obtaining, by the data aggregator, a second updated threshold based on the second data trend, the second updated threshold being likely to decrease the rate of the data transmission from the data collector to the data aggregator;

enforcing, by the data aggregator, the second updated threshold on the data collector.

13. The non-transitory machine-readable medium of claim 12, wherein the second updated threshold is smaller than the updated threshold.

14. The non-transitory machine-readable medium of claim 13, wherein the updated threshold specifies when representations of measurements obtained by the data collector are to be provided to the data aggregator.

15. The non-transitory machine-readable medium of claim 14, wherein the data trend indicates that the measurements obtained by the data collector are likely to meet the keyed characteristic of the time series relationship.

16. A data aggregator, comprising:

a processor; and a memory coupled to the processor to store instructions, which when executed by the processor, cause the processor to perform operations for managing data collection in a distributed environment where data is collected in a data aggregator of the distributed environment and from a data collector operably connected to the data aggregator via a communication system, the operations comprising:

obtaining, by the data aggregator, a portion of validated data, the portion of validated data increases a duration of a time series relationship represented by the validated data;

making a determination, by the data aggregator, that a data trend in the validated data has occurred based at least in part on the portion of the validated data and a sensitivity of a consumer of the validated data, the sensitivity of the consumer being based on a change in operation of the consumer which is keyed to a characteristic of the time series relationship;

obtaining, by the data aggregator, an updated threshold based on the data trend, the updated threshold being likely to increase a rate of data transmission from the data collector to the data aggregator;

enforcing, by the data aggregator, the updated threshold on a data collector associated with the portion of the validated data.

17. The data aggregator of claim 16, wherein the operations further comprise:

obtaining, by the data aggregator, a second portion of the validated data, the second portion of validated data further increases the duration of the time series relationship represented by the validated data;

making a second determination, by the data aggregator, that a second data trend in the validated data has occurred based at least in part on the second portion of the validated data and the sensitivity of the consumer of the validated data;

obtaining, by the data aggregator, a second updated threshold based on the second data trend, the second updated threshold being likely to decrease the rate of the data transmission from the data collector to the data aggregator;

enforcing, by the data aggregator, the second updated threshold on the data collector.

18. The data aggregator of claim 17, wherein the second updated threshold is smaller than the updated threshold.

19. The data aggregator of claim 18, wherein the updated threshold specifies when representations of measurements obtained by the data collector are to be provided to the data aggregator.

20. The data aggregator of claim 19, wherein the data trend indicates that the measurements obtained by the data collector are likely to meet the keyed characteristic of the time series relationship.

* * * * *